(12) United States Patent
Kuhara

(10) Patent No.: US 9,904,285 B2
(45) Date of Patent: Feb. 27, 2018

(54) MOVEMENT CONTROL METHOD FOR AUTONOMOUS MOBILE ROBOT

(71) Applicant: Panasonic Intellectual Property Corporation of America, Torrance, CA (US)

(72) Inventor: Shunsuke Kuhara, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/088,293

(22) Filed: Apr. 1, 2016

(65) Prior Publication Data

US 2016/0320774 A1 Nov. 3, 2016

(30) Foreign Application Priority Data

Apr. 28, 2015 (JP) ................................ 2015-092338

(51) Int. Cl.
*G05D 1/00* (2006.01)
*G05D 1/02* (2006.01)

(52) U.S. Cl.
CPC ......... *G05D 1/0027* (2013.01); *G05D 1/0219* (2013.01); *G05D 1/0287* (2013.01); *G05D 1/0289* (2013.01); *G05D 2201/0203* (2013.01)

(58) Field of Classification Search
CPC .................................................. G05D 1/0027
See application file for complete search history.

(56) References Cited

FOREIGN PATENT DOCUMENTS

| JP | 2005-313303 | 11/2005 |
|---|---|---|
| JP | 2014-054335 | 3/2014 |

*Primary Examiner* — Adam D Tissot
*Assistant Examiner* — Michael A Berns
(74) *Attorney, Agent, or Firm* — Greenblum & Bernstein, P.L.C.

(57) ABSTRACT

A method including, when having completed a task with respect to a first coverage region, selecting a support-target robot from within a robot group, which is a plurality of robots capable of communicating with the first robot, starting to cause the first robot to move toward a second coverage region assigned to the selected second robot, and, when the first robot become newly possible to communicate with a third robot from among the plurality of robots while moving toward the second coverage region, determining whether to alter the support-target robot to the third robot, when the support-target robot is determined to be altered to third robot, starting to cause the first robot to move toward a third coverage region that is assigned to the third robot.

13 Claims, 24 Drawing Sheets

| ROBOT ID | LOCATION INFORMATION | EXPECTED TASK END TIME | TASK PROCESSING AMOUNT PER UNIT TIME (/min.) | TASK-INCOMPLETE REGION |
|---|---|---|---|---|
| AUTONOMOUS ROBOT 12 | (−20, 40) | 14:00:00 | 1 | 30 |
| AUTONOMOUS ROBOT 13 | (30, 5) | 14:30:00 | 0.7 | 42 |
| AUTONOMOUS ROBOT 14 | (30, 40) | 15:00:00 | 1 | 36 |

FIG. 13

| ROBOT ID | COMMUNICATION STATUS | LOCAL ROBOT RECEPTION LOCATION | LOCATION INFORMATION | EXPECTED TASK END TIME | TASK PROCESSING AMOUNT PER UNIT TIME (/min.) | REMAINING TASK AMOUNT |
|---|---|---|---|---|---|---|
| AUTONOMOUS ROBOT 12B | COMMUNICATION NOT POSSIBLE | (−10, 0) | (−20, 40) | 14:00:00 | 1 | 30 |
| AUTONOMOUS ROBOT 13B | COMMUNICATION POSSIBLE | (0, 0) | (30, 5) | 14:30:00 | 0.7 | 35 |
| AUTONOMOUS ROBOT 14B | COMMUNICATION POSSIBLE | (0, 0) | (30, 40) | 15:00:00 | 0.4 | 32 |

FIG. 19

| ROBOT ID | COMMUNICATION STATUS | LAST RECEPTION TIME | LOCATION INFORMATION | EXPECTED TASK END TIME | TASK PROCESSING AMOUNT PER UNIT TIME (/min.) | REMAINING TASK AMOUNT |
|---|---|---|---|---|---|---|
| AUTONOMOUS ROBOT 12C | COMMUNICATION NOT POSSIBLE | 13:25:00 | (−20, 40) | 14:00:00 | 1 | 30 |
| AUTONOMOUS ROBOT 13C | COMMUNICATION POSSIBLE | 13:30:00 | (30, 5) | 14:30:00 | 0.7 | 42 |
| AUTONOMOUS ROBOT 14C | COMMUNICATION POSSIBLE | 13:30:00 | (30, 40) | 15:00:00 | 0.4 | 36 |

MOVEMENT CONTROL METHOD FOR AUTONOMOUS MOBILE ROBOT

BACKGROUND

1. Technical Field

The present disclosure relates to a movement control method and a movement control device, and particularly relates to a movement control method and a movement control device in a robot system made up of a plurality of autonomous mobile robots that execute tasks while moving autonomously.

2. Description of the Related Art

Techniques have been proposed in relation to an autonomous mobile robot (hereinafter referred to as an autonomous robot) that executes tasks assigned thereto while cooperating with other autonomous robots (for example, see Japanese Unexamined Patent Application Publication No. 2014-054335 and Japanese Patent No. 4713846).

Japanese Unexamined Patent Application Publication No. 2014-054335 discloses a technique in which a server assigns coverage regions to each of a plurality of cleaning robots, and causes the plurality of cleaning robots to perform cleaning. Japanese Patent No. 4713846 discloses a technique in which, in a system configured from a server and a plurality of autonomous robots, the plurality of autonomous robots receive instructions from the server and thereafter exchange information of one another to execute tasks while cooperating.

SUMMARY

The aforementioned conventional techniques do not take into consideration the case where other autonomous robots with which communication is possible dynamically change due to the autonomous robots moving.

One non-limiting and exemplary embodiment provides a movement control method and a movement control device with which it is possible for an autonomous robot to cooperate with a greater number of other autonomous robots to execute tasks even in the case where the other autonomous robots with which communication is possible dynamically change.

In one general aspect, the techniques disclosed here feature a movement control method in a robot system made up of a plurality of autonomous mobile robots that execute tasks with respect to coverage regions assigned respectively thereto, the movement control method including: selecting, when having completed a task with respect to a first coverage region assigned to a first robot from among the plurality of robots, a second robot as a support-target robot from within a robot group, which is made up of a plurality of robots other than the first robot that are within a communication range of the first robot from among the plurality of robots; starting to cause the first robot to move toward a second coverage region assigned to the selected second robot; determining, when a third robot from among the plurality of robots is newly within the communication range of the first robot while the first robot moving toward the second coverage region, whether to alter the support-target robot from the second robot to the third robot; and starting to cause the first robot, when having determined to alter the support-target robot from the second robot to the third robot, to move toward a third coverage region assigned to the third robot.

According to the present disclosure, it is possible to realize a movement control method and a movement control device with which it is possible for an autonomous robot to cooperate with a greater number of other autonomous robots to execute tasks even in the case where the other autonomous robots with which communication is possible dynamically change.

It should be noted that these comprehensive or specific aspects may be realized by a system, a method, an integrated circuit, a computer program, or a recording medium, and may be realized by an arbitrary combination of a system, a method, an integrated circuit, a computer program, and a recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 13 is a drawing depicting an example of other robot information depicted in FIG. 12;

FIG. 19 is a drawing depicting an example of other robot information depicted in FIG. 18;

Figure 1:
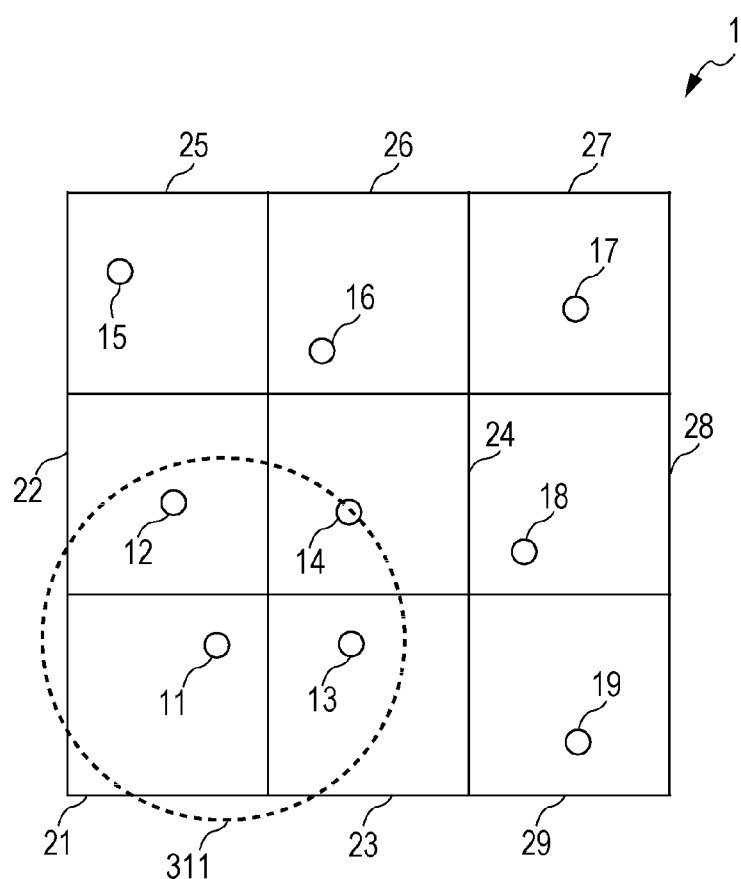
FIG. 1 is a drawing conceptually depicting an overall view of a robot system in embodiment 1.

DETAILED DESCRIPTION (Findings Forming the Basis for the Present Disclosure)

Japanese Unexamined Patent Application Publication No. 2014-054335 discloses a technique in which a server controls a plurality of cleaning robots and causes the plurality of cleaning robots to perform cleaning while cooperating. More specifically, in the technique disclosed in Japanese Unexamined Patent Application Publication No. 2014-054335, the server assigns coverage regions to each of the plurality of cleaning robots and causes the plurality of cleaning robots to perform cleaning. The cleaning robots notify the progress status of the cleaning to the server while cleaning the coverage regions assigned from the server. The server receives notifications from the cleaning robots and thereby comprehends the task progress status of the cleaning robots. In the case where a notification that cleaning has been completed is received from one cleaning robot, the server performs a reassignment in which an uncleaned region from within the coverage region of another robot that has not yet completed cleaning is assigned to the aforementioned one robot.

However, the technique disclosed in Japanese Unexamined Patent Application Publication No. 2014-054335 is a configuration in which a server is used to allow cleaning robots to cooperate. Therefore, it is necessary to construct a server for allowing the plurality of cleaning robots to cooperate, and there are costs for constructing a server. In addition, in the case where the server becomes inoperative due to a malfunction or the like, there is a problem in that reassignment or the like cannot be performed with respect to the cleaning robots, and the plurality of cleaning robots cannot be made to cooperate appropriately. Furthermore, in the case where the communication between the server and a cleaning robot has been interrupted, the server is no longer able to comprehend the task progress status of the cleaning robot with which communication has been interrupted. Therefore, the server is no longer able to make the plurality of cleaning robots cooperate appropriately.

In light of the above, a method is required in which a plurality of cleaning robots, namely autonomous robots, are made to cooperate without employing central control in which a central device such as a server is used. In other words, a method is required in which the entirety of a system made up of a plurality of autonomous robots is made to cooperate by each autonomous robot cooperating with surrounding autonomous robots while mutually exchanging information with the surrounding autonomous robots.

Then, if such a configuration can be realized, a central device to comprehend the entirety of the system does not have to be employed, and it is therefore not necessary to construct the central device and costs for constructing the central device can be limited. In addition, even if one autonomous robot becomes inoperative due to a malfunction or the like, there is no effect whatsoever on the cooperation among the other autonomous robots, and therefore there are no cases where cooperative operations no longer function across the entirety of the system. Naturally, in the case where a cooperative operation was being performed with the autonomous robot that has malfunctioned, there is an effect on the autonomous robot that was performing the cooperative operation and the like. However, that effect is a local effect when viewed from the entirety of the system, and the entirety of the system is not affected.

Japanese Patent No. 4713846 discloses a system configuration in which it is not necessary to construct a central device. Japanese Patent No. 4713846 discloses a method in which the entirety of a system is made to cooperate by each autonomous robot cooperating with surrounding autonomous robots while mutually exchanging information with the surrounding autonomous robots, rather than cooperation by means of central control in which a server or the like is used. Japanese Patent No. 4713846 discloses a system configured from a server and a plurality of autonomous robots; however, the plurality of autonomous robots merely receive instructions from the server, and after having received the instructions from the server, the plurality of autonomous robots exchange information of one another to execute tasks while cooperating. When cooperating with other autonomous robots to execute tasks, the plurality of autonomous robots in Japanese Patent No. 4713846 communicate with other autonomous robots within a communication range, exchange location information, task progress information, and the like with each other, and cooperate with each other to execute tasks on the basis of that information.

However, when an autonomous robot such as a cleaning robot moves, the communication range of the cleaning robot changes. Therefore, there are cases where the other autonomous robots with which the autonomous robot can communicate change due to the movement of the autonomous robot. In these cases, due to the autonomous robot moving, the information of the other autonomous robots that can be acquired by the autonomous robot changes.

For example, although communication had been possible with a certain autonomous robot A before the movement, due to the movement of the autonomous robot, there are cases where communication is no longer possible after the movement. In these cases, the autonomous robot cannot acquire the information of the autonomous robot A. Furthermore, for example, although communication was not possible with another autonomous robot B before the movement, due to the movement of the autonomous robot, there are also cases where communication becomes possible after the movement. In these cases, the autonomous robot becomes able to newly acquire the information of the autonomous robot B.

In the case of a method in which each autonomous robot cooperates with surrounding autonomous robots while exchanging information of one another, each autonomous robot uses only the information of surrounding autonomous robots to perform cooperation. That is, each autonomous robot is not able to use the information of all of the autonomous robots making up the system, and uses only the information of surrounding autonomous robots to perform cooperation. Therefore, the autonomous robots are not always able to perform optimum cooperation when viewed from the entirety of the system. In order to perform more suitable cooperation, it is desirable that each autonomous robot use the information of a greater number of autonomous robots to perform cooperation. In particular, in the case where an autonomous robot moves in the manner of a cleaning robot, due to the movement of the autonomous robot, the information of other autonomous robots that can be acquired by the autonomous robot dynamically changes, and therefore, taking this into consideration, it is desirable that the information of a greater number of other autonomous robots be used to perform more suitable cooperation.

However, in Japanese Patent No. 4713846, there is no suggestion whatsoever regarding dynamic changes in the information of other autonomous robots that can be acquired by an autonomous robot, caused by the movement of the autonomous robot. In Japanese Patent No. 4713846, it is assumed that all of the autonomous robots are able to communicate with each other, and it is thought that no consideration whatsoever is given to the communication range of an autonomous robot changing and the information of other autonomous robots that can be acquired by the autonomous robot changing due to the movement of the autonomous robot.

Thus, hereinafter, a proposal is given regarding a movement control method and a movement control device with which it is possible for an autonomous robot to cooperate with a greater number of other autonomous robots to execute tasks even in the case where the other autonomous robots with which communication is possible dynamically change.

A movement control method according to a mode of the present disclosure is a movement control method in a robot system made up of a plurality of autonomous mobile robots that execute tasks with respect to coverage regions assigned respectively thereto, the movement control method including: selecting, when having completed a task with respect to a first coverage region assigned to a first robot from among the plurality of robots, a second robot as a support-target robot from within a robot group, which is made up of a plurality of robots other than the first robot that are within a communication range of the first robot from among the plurality of robots; starting to cause the first robot to move toward a second coverage region assigned to the selected second robot; determining, when a third robot from among the plurality of robots is newly within the communication range of the first robot while the first robot moving toward the second coverage region, whether to alter the support-target robot from the second robot to the third robot; and starting to cause the first robot, when having determined to alter the support-target robot from the second robot to the third robot, to move toward a third coverage region assigned to the third robot.

Thus, the first robot, which has completed a task with respect to an assigned coverage region, is able to perform support-target alteration processing on the basis of information from the third robot, with which communication has become newly possible when moving toward the second robot that is a support target, namely a task-support target, and therefore the first robot is able to select a more appropriate robot as a support target. That is, it is possible for an autonomous robot to cooperate with a greater number of autonomous robots to execute tasks even in the case where the other autonomous robots with which communication is possible dynamically change. In this way, it is possible to realize a movement control method with which it is possible to coordinate with other autonomous robots to execute tasks more efficiently.

Here, the first robot may acquire third robot information that includes location information indicating the current location of the third robot and task information indicating a task progress status of the third robot, and, in the determining, the first robot may use the acquired third robot information to determine whether to alter the support-target robot from the second robot to the third robot.

Furthermore, in the determining, the first robot may determine to alter the support-target robot from the second robot to the third robot when the time at which the third robot will complete a task with respect to the third coverage region is later than the time at which the second robot will complete a task with respect to the second coverage region and there will be a remaining task for the third robot at the point in time at which the first robot will have moved from the current location thereof to the current location of the third robot.

Furthermore, when the first robot starts moving toward the second coverage region, the first robot may notify the second robot of information indicating that the first robot is moving thereto to provide support for completing the task for the second coverage region, and, when the first robot starts moving toward the third coverage region, the first robot may notify the third robot of information indicating that support for completing the task for the third coverage region is to be provided, and also notify the second robot of information indicating that the first robot is not moving thereto to provide support for the second robot.

The first robot is thereby able to notify the second robot, with which communication is possible with the first robot, that the first robot is no longer moving thereto to provide task support.

It thereby becomes possible for the second robot, when having completed its own tasks and performing selection processing for a support-target robot, to take into consideration that the first robot is no longer coming to provide support.

Furthermore, the first robot, when it has become newly possible to communicate with an $M^{th}$ robot (M being a natural number of 3 or more) from among the plurality of robots while moving toward an $N^{th}$ coverage region (N being a natural number of 3 or more) that includes the third coverage region but not the first coverage region, may determine whether to alter the support-target robot to the $M^{th}$ robot, and the first robot, when having determined to alter the support-target robot to the $M^{th}$ robot, may start to move toward an $M^{th}$ coverage region assigned to the $M^{th}$ robot.

Here, the first robot may have a memory that stores frequency information indicating a frequency limit that is the number of times that the support-target robot can be altered, and, in the alteration determination step, the first robot may determine not to alter the support-target robot to the $M^{th}$ robot when the number of times that the support-target robot has been altered has exceeded the frequency limit indicated in the frequency information stored in the memory.

It thereby becomes possible to limit an increase in the time taken for the first robot to arrive at the coverage region of the support-target robot and there being less time for supporting the support-target robot due to the support-target robot being altered numerous times.

Furthermore, the first robot may receive robot information, which includes location information indicating a current location and task information indicating a task progress status, from each robot of the robot group, the first robot may use the current location of the first robot and the received robot information of each robot of the robot group to acquire the remaining tasks of each robot for a point in time at which the first robot will have moved to the current location of each robot of the robot group; and, in the selecting, the first robot may select the second robot as the support-target robot from within the robot group on the basis of the acquired remaining tasks.

The first robot is thereby able to acquire the remaining tasks of each robot of the robot group, and is therefore able to select the support-target robot on the basis of the acquired remaining tasks. It is thereby possible to prevent the tasks of the support-target robot being completed while the first robot is moving toward the support-target robot, and the movement being rendered unnecessary.

Furthermore, the first robot may have a memory for storing the robot information of each robot of the robot group received while executing the task with respect to the first coverage region, the robot information of each robot of the robot group may further include time information indicating the time at which the robot information has been received by the first robot, the first robot may move within the first coverage region when the first robot has received at least one item of robot information from among the robot information of each robot of the robot group stored in the memory, outside of a prescribed period that is based on the point in time at which the task with respect to the first coverage region has been completed, in the receiving, in addition, the first robot may once again receive the robot information from the robot corresponding to the at least one item of robot information when it has become possible for the first robot to communicate with the robot corresponding to the at least one item of robot information while moving within the first coverage region, and, in the acquiring of the remaining tasks, the remaining tasks of each robot of the robot group may be acquired based on the robot information that has been received once again.

The first robot is thereby able to select a support-target robot using robot information that is received immediately before or immediately after completing the task for the coverage region thereof, and therefore becomes able to appropriately select a support-target robot.

Furthermore, the memory may have additionally stored therein reception location information indicating the location of the first robot when the first robot received the robot information of each robot of the robot group received while executing the task with respect to the first coverage region, and the first robot may move within the first coverage region toward the location indicated by the reception location information corresponding to the at least one item of robot information.

The first robot is thereby able to acquire even more robot information by moving within the coverage region thereof, and therefore becomes able to appropriately select a support-target robot.

More specifically, the first robot, when moving within the coverage region to newly acquire robot information, moves toward a location at which corresponding robot information has been previously received. The first robot is thereby able to communicate with the robot of said robot information more quickly, and therefore becomes able to select a support-target robot more quickly.

Furthermore, the first robot may have a memory for storing the robot information of each robot of the robot group received while executing the task with respect to the first coverage region, the robot information of each robot of the robot group may further include time information indicating the time at which the robot information has been received by the first robot, in the selecting, the support-target robot may be selected from within a robot group, which is a plurality of robots other than the first robot with which communication is currently possible and has been possible in the past with the first robot from among the plurality of robots, and, in the acquiring of the remaining tasks, in addition, the robot information and time information, stored in the memory, of at least one robot from among the plurality of robots with which communication has been possible in the past with the first robot and the current location of the first robot may be used to estimate the remaining tasks of the at least one robot for a point in time at which the first robot will have moved to the at least one robot, thereby acquiring the remaining tasks of each robot of the robot group including the at least one robot.

The first robot is thereby able to accurately estimate the remaining tasks of each robot of the robot group, and is therefore able to appropriately select a support-target robot.

Furthermore, when the first robot has completed the task with respect to the first coverage region and is not able to select the support-target robot from within the robot group while present within the first coverage region, the first robot may move to outside of the first coverage region, when it has become possible for the first robot to communicate with a robot not included in the robot group, from among the plurality of robots while moving to outside of the first coverage region, the first robot may receive robot information, which includes location information indicating a current location and task information indicating a task progress status, from the robot not included in the robot group, the first robot may use the current location of the first robot and the received robot information of the robot not included in the robot group to acquire the remaining tasks for the point in time at which the first robot will have moved to the current location of the robot not included in the robot group, and the first robot may select the robot not included in the robot group as the support-target robot on the basis of the remaining tasks acquired in the remaining task acquisition step.

Thus, by moving to outside of the coverage region, the first robot is able to establish, as a communication range, a new region that up to that point in time had been outside of the communication range, and becomes able to communicate with new other robots with which communication had not been possible up to that point in time. The first robot is thereby able to acquire robot information from the new other robot, and therefore becomes able to select a support-target robot.

Furthermore, in the acquiring of the remaining tasks, the first robot may use the current location of the first robot and the received location information of each robot of the robot group to calculate movement times to the current locations of each robot of the robot group, and may use the calculated movement times and the received task information of each robot of the robot group to estimate the amount of remaining tasks of each robot, thereby acquiring the remaining tasks of each robot.

Furthermore, in the selecting, the first robot may select the second robot having the largest amount of remaining tasks acquired in the remaining task acquisition step, from within the robot group, as the support-target robot.

It is thereby possible for the second robot having, as a selection standard, the largest amount of estimated remaining tasks to be selected as the support-target robot, and it therefore becomes possible to select the robot that requires the most support.

Furthermore, a movement control device according to the present disclosure is a movement control device of a first robot in a robot system made up of a plurality of autonomous mobile robots that execute tasks with respect to coverage regions assigned respectively thereto, the movement control device including: one or more memories; and circuitry which, in operation, when a task with respect to a first coverage region assigned to the first robot has been completed, selects a second robot as a support-target robot from within a robot group, which is a plurality of robots other than the first robot that are within a communication range of the first robot, from among the plurality of robots, performs control that causes the first robot to start moving toward a second coverage region assigned to the selected second robot, when a third robot from among the plurality of robots is newly within the communication range of the first robot while the first robot moving toward the second coverage region, determines whether to alter the support-target robot from the second robot to the third robot, and, when having determined to alter the support-target robot from the second robot to the third robot, performs control that causes the first robot to start moving toward a third coverage region assigned to the third robot.

It should be noted that these comprehensive or specific aspects may be realized by a system, a method, an integrated circuit, a computer program, or a recording medium such as a computer-readable CD-ROM, and may be realized by an arbitrary combination of a system, a method, an integrated circuit, a computer program, or a recording medium.

Hereinafter, a movement control method and the like according to an aspect of the present disclosure will be described with reference to the drawings.

It should be noted that the embodiments described hereinafter all represent a specific example of the present disclosure. The numerical values, the shapes, the materials, the constituent elements, and the arrangement positions of the constituent elements and the like given in the following embodiments are examples and are not intended to restrict the present disclosure. Furthermore, constituent elements that are not described in the independent claims indicating the most significant concepts from among the constituent elements in the following embodiments are described as optional constituent elements.

Hereinafter, a description will be given with task coverage regions having been assigned in advance to each of a plurality of autonomous robots.

(Embodiment 1)

In the present embodiment, a description is given regarding a movement control method and the like implemented such that, in a situation in which a plurality of autonomous robots autonomously move within respective coverage regions to execute tasks, an autonomous robot that has completed tasks with respect to the assigned coverage region cooperates with another autonomous robot to execute tasks.

It should be noted that an autonomous robot cooperating with another autonomous robot to execute tasks means the autonomous robot, after having completed the tasks for the coverage region assigned thereto, provides support for the tasks of another autonomous robot that has not yet completed said tasks. Furthermore, support for the tasks means the autonomous robot executes a portion of the tasks of the other autonomous robot. This portion of the tasks is assigned to the autonomous robot from the other autonomous robot.

The autonomous robot is a cleaning robot, a search robot, an inspection robot, or the like. The tasks executed by the autonomous robot are the suction processing of garbage and dust in the case where the autonomous robot is a cleaning robot, sensing for searching for a target object such as a land mine in the case where the autonomous robot is a search robot, and sensing for confirming abnormalities of an inspection target such as a bridge or a building in the case where the autonomous robot is an inspection robot.

[Robot System Overview]

FIG. 1 is a drawing conceptually depicting an overall view of a robot system in embodiment 1.

A robot system 1 depicted in FIG. 1 is made up of a plurality of autonomous mobile robots that execute tasks for respectively assigned coverage regions. In the present embodiment, the robot system 1 is made up of autonomous robots 11 to 19.

Task coverage regions 21 to 29 are assigned in advance to the autonomous robots 11 to 19, respectively. Each of the autonomous robots 11 to 19 moves autonomously within the preassigned coverage regions 21 to 29 to execute tasks.

Furthermore, each of the autonomous robots 11 to 19 has a communication function. In the present embodiment, the region in which communication is possible for each of the autonomous robots 11 to 19 is limited. Autonomous robots within a region in which communication is possible are able to exchange information with each other. For example, in FIG. 1, a communication range 311 is depicted as a region in which communication is possible for the autonomous robot 11, and it is depicted that the autonomous robot 11 is able to communicate with the other autonomous robots 12, 13, and 14 that are within the communication range 311.

In the robot system 1 configured as described above, each autonomous robot executes tasks for a preassigned coverage region and also communicates with other neighboring autonomous robots that are within a communication range to exchange information with each other.

It should be noted that, as a method for allocating a coverage region for an autonomous robot, for example, a coverage region may be allocated to an autonomous robot before the autonomous robot starts a task. Furthermore, an autonomous robot to which a coverage region has not yet been assigned may issue a request to another autonomous robot to which a coverage region has already been assigned, for a portion of the coverage region of the other autonomous robot to be assigned to said autonomous robot. Furthermore, an autonomous robot may perform environment confirmation before starting a task, for the autonomous robot to set a coverage region itself. The assignment method is not restricted to the aforementioned methods as long as the autonomous robot has a coverage region before executing a task.

[Functional Configuration of Autonomous Robot]

Figure 2:
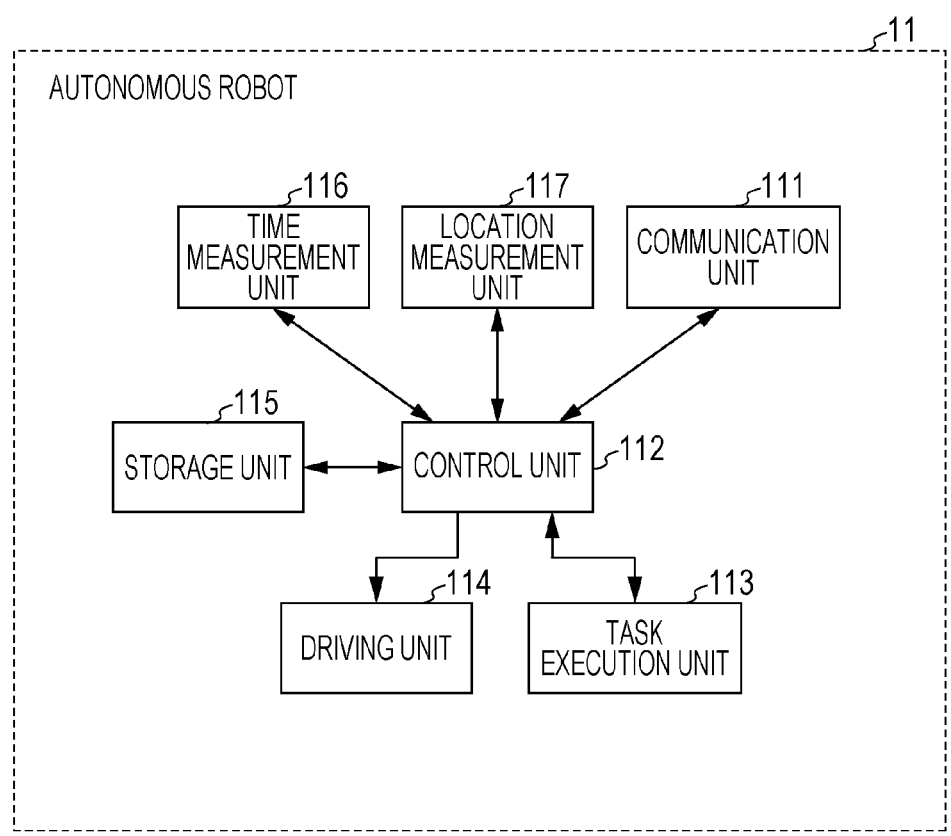
FIG. 2 is a block diagram depicting an example of the functional configuration of an autonomous robot in embodiment 1.

The autonomous robots 11 to 19 are of the same type or are provided with at least the functional configuration depicted in FIG. 2. Hereinafter, the functional configuration of the autonomous robot 11 will be representatively described.

FIG. 2 is a block diagram depicting an example of the functional configuration of the autonomous robot 11 in embodiment 1.

As depicted in FIG. 2, the autonomous robot 11 is provided with at least a communication unit 111, a control unit 112, a task execution unit 113, a driving unit 114, a storage unit 115, a time measurement unit 116, and a location measurement unit 117.

The communication unit 111 is an interface that uses a short-distance wireless communication technology such as Wi-Fi for communicating with other autonomous robots. The communication unit 111 transmits, to other autonomous robots, specific information relating thereto (the autonomous robot 11), task information relating to tasks thereof (the autonomous robot 11), and location information thereof, for example. Furthermore, the communication unit 111 receives information transmitted from other autonomous robots. It should be noted that the communication unit 111 is driven by a battery or the like in the autonomous robot 11, and the region in which communication is possible is limited as described above.

The task execution unit 113 executes a task upon receiving an instruction from the control unit 112. Here, in the case where the autonomous robot 11 is a cleaning robot for example, the task execution unit 113 is a garbage suction device for sucking up garbage. Furthermore, in the case where the autonomous robot 11 is a land mine search robot for example, the task execution unit 113 is a land mine sensing device for sensing land mines underground, and in the case where the autonomous robot 11 is an inspection robot for example, the task execution unit 113 is a sensor information collection device for sequentially acquiring information of sensors provided in advance in an inspection-target building.

The driving unit 114 is configured from a motor and wheels, and when an instruction is received from the control unit 112, the motor is driven and the wheels are rotated, thereby driving the autonomous robot 11.

The storage unit 115 stores local robot information made up of specific information relating to the autonomous robot 11 and task information relating to tasks of the autonomous robot 11, and other robot information that is based on information transmitted from other robots. For example, the storage unit 115 stores frequency information indicating a frequency limit that is the number of times that a support-target robot can be altered. The storage unit 115 stores other information; however, the details thereof are described later on and a description thereof is therefore omitted here.

When time information is required, the time measurement unit 116 receives an instruction from the control unit 112 to perform a time measurement. For example, the time measurement unit 116 measures a task start time when the execution of a task of the autonomous robot 11 is started, and measures a task completion time when the execution of the task of the autonomous robot 11 is completed.

The location measurement unit 117 acquires location information for the autonomous robot 11. For example, the location measurement unit 117 measures location information by means of a GPS.

The control unit 112 performs control for the aforementioned communication unit 111, the task execution unit 113, the driving unit 114, the storage unit 115, the time measurement unit 116, and the location measurement unit 117.

[Control Unit 112]

Here, an example of the detailed configuration of the control unit 112 will be described.

Figure 3:
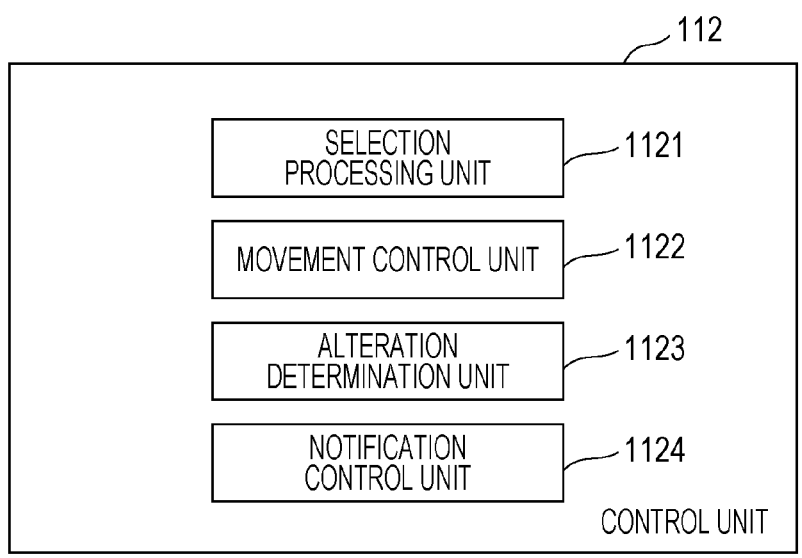
FIG. 3 is a block diagram depicting an example of the detailed configuration of a control unit depicted in FIG. 2.

FIG. 3 is a block diagram depicting an example of the detailed configuration of the control unit depicted in FIG. 2.

As depicted in FIG. 3, the control unit 112 is provided with a selection processing unit 1121, a movement control unit 1122, an alteration determination unit 1123, and a notification control unit 1124.

In the case where a task with respect to a coverage region 21 (first coverage region) assigned to the autonomous robot 11 (first robot) has been completed, the selection processing unit 1121 selects a support-target robot from within a robot group, which is a plurality of autonomous robots other than the autonomous robot 11 (first robot) that are able to communicate with the autonomous robot 11 (first robot) from among the plurality of autonomous robots.

For example, first, the selection processing unit 1121 causes robot information, which includes location information indicating a current location and task information indicating a task progress status, to be received by the communication unit 111 from each robot of the robot group. Next, the selection processing unit 1121 uses the current location of the autonomous robot 11 (first robot) measured by the location measurement unit 117 and the plurality of items of robot information acquired by the communication unit 111 to acquire the remaining tasks of each robot of the robot group for a point in time at which the autonomous robot 11 (first robot) will have moved to the current location of each robot. The selection processing unit 1121 then selects a support-target robot (second robot) from within the robot group on the basis of the acquired remaining tasks. Here, for example, the selection processing unit 1121 may select the robot having the largest amount of remaining tasks acquired, from within the robot group, as the support-target robot.

In the case where it has become newly possible for the autonomous robot 11 (first robot) to communicate with a third robot from among the plurality of autonomous robots while moving to a second coverage region assigned to the support-target robot (second robot), the alteration determination unit 1123 performs processing to determine whether to alter the support-target robot from the second robot to the third robot. For example, the alteration determination unit 1123 causes the communication unit 111 to acquire third robot information, which includes location information indicating the current location of the third robot and task information indicating the task progress status of the third robot, and uses the acquired third robot information to determine whether to alter the support-target robot from the second robot to the third robot.

In addition, in the case where it has become newly possible for the autonomous robot 11 (first robot) to communicate with an $M^{th}$ robot (M being a natural number of 3 or more) from among the plurality of autonomous robots while moving to an $N^{th}$ coverage region (N being a natural number of 3 or more) that includes a third coverage region but not the coverage region 21 (first coverage region), the alteration determination unit 1123 determines whether to alter the support-target robot to the $M^{th}$ robot. It should be noted that the alteration determination unit 1123 determines not to alter the support-target robot to the $M^{th}$ robot in the case where the number of times that the support-target robot has been altered has exceeded the frequency limit indicated in the frequency information stored in the storage unit 115.

The movement control unit 1122 performs control that causes the autonomous robot 11 (first robot) to start moving toward the second coverage region assigned to the support-target robot (second robot) selected by the selection processing unit 1121. Furthermore, in the case where it is determined by the alteration determination unit 1123 that the support-target robot is to be altered from the second robot to the third robot, the movement control unit 1122 performs control that causes the first robot (autonomous robot 11) to start moving toward the third coverage region assigned to the third robot. Furthermore, in the case where the alteration determination unit 1123 has determined that the support-target robot is to be altered to the $M^{th}$ robot, the movement control unit 1122 performs control that causes movement to be started toward an $M^{th}$ coverage region assigned to the $M^{th}$ robot.

When the first robot (autonomous robot 11) starts moving toward the second coverage region due to the movement control unit 1122, the notification control unit 1124 performs control to notify the second robot with information indicating that the first robot is moving thereto to provide support for completing the tasks for the second coverage region. Furthermore, in the case where the alteration determination unit 1123 has determined that the support-target robot is to be altered to the third robot, when the first robot (autonomous robot 11) is made to start moving toward the third coverage region by the movement control unit 1122, the notification control unit 1124 performs control to notify the third robot with information indicating that the first robot will provide support for completing the tasks for the third coverage region, and also notifies the second robot with information indicating that the first robot will not move thereto to support the second robot.

[Storage Unit 115]

Next, the information stored in the storage unit 115 of the autonomous robot 11 will be described in detail using the drawings.

Figure 4:
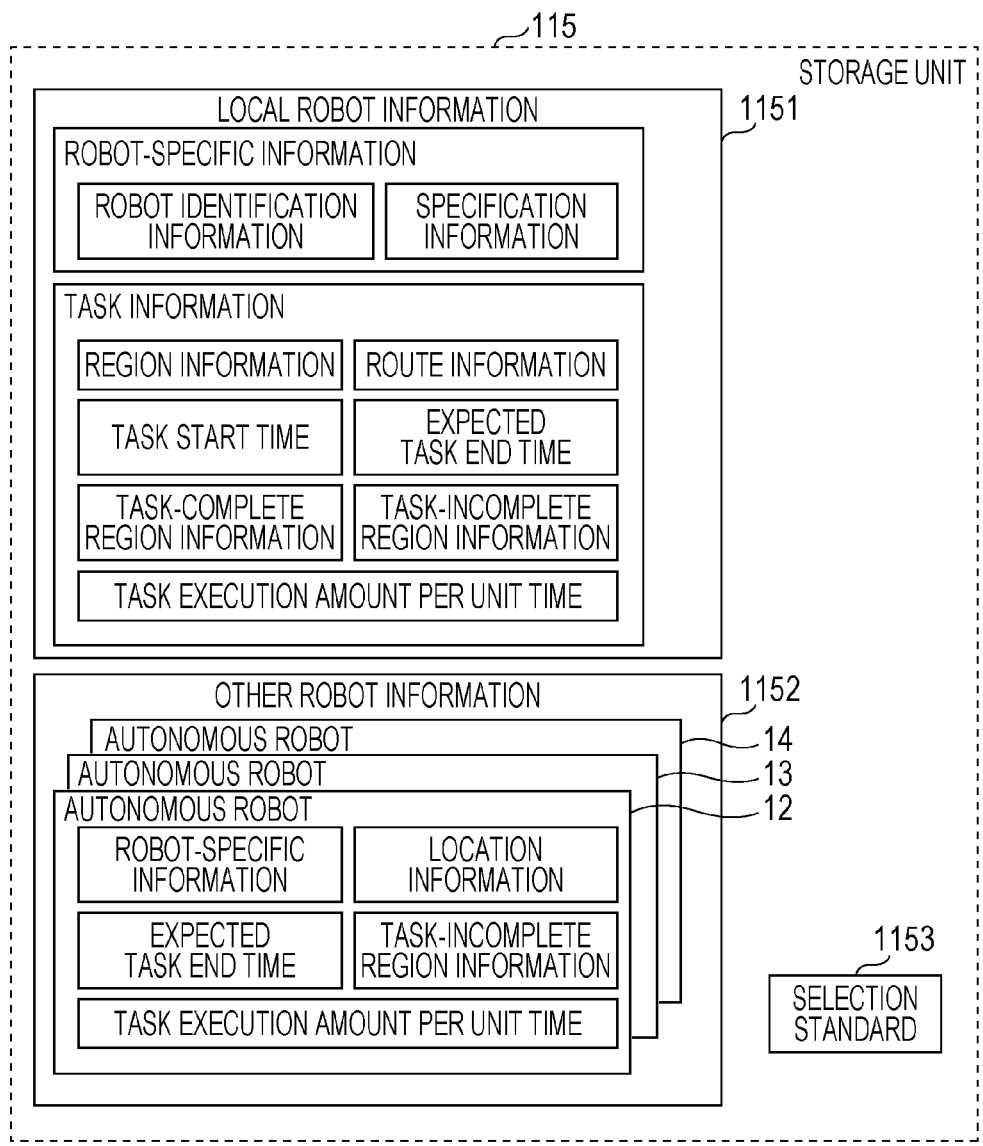
FIG. 4 is a drawing conceptually depicting information stored in a storage unit of an autonomous robot in embodiment 1.

FIG. 4 is a drawing conceptually depicting the information stored in the storage unit 115 of the autonomous robot 11 according to embodiment 1.

The storage unit 115 is provided with local robot information 1151, other robot information 1152, and a selection standard 1153.

(Details of the Local Robot Information)

The local robot information 1151 is information relating to the autonomous robot 11 itself, and is made up of robot-specific information and task information.

The robot-specific information is made up of robot identification information for uniquely identifying the autonomous robot 11, and specification information indicating the specifications of the autonomous robot 11. Here, the information indicating the specifications of the autonomous robot 11 is, for example, information such as a movement speed for when the autonomous robot 11 moves and a task processing capability indicating a task processing amount per unit time.

The task information is information relating to tasks for the coverage region 21 assigned to the autonomous robot 11. This task information is made up of region information, route information, a task start time, an expected task end time, task-complete region information, task-incomplete region information, and a task execution amount per unit time.

The region information is information indicating, for example, a map or the area of the task coverage region 21 assigned to the autonomous robot 11. Here, the region information may be set in advance from the user, for example. Furthermore, the region information may be set by, for example, the autonomous robot 11 issuing a request to another autonomous robot to which a coverage region has already been assigned, for a portion of the coverage region of the other autonomous robot to be assigned to the autonomous robot 11. Furthermore, for example, the region information may be set by the autonomous robot 11 itself by acquiring environment information before starting a task.

The route information is information indicating the kind of route along which the autonomous robot 11 is to move within the coverage region 21. More specifically, the route information is information indicating the kind of route along which the autonomous robot 11 is to move with respect to the coverage region 21 or the like indicated in the region information. Here, the route information may be set in advance from the user, for example. Furthermore, the route information may be set, for example, when the autonomous robot 11 issues a request to another autonomous robot to which a coverage region has already been assigned, for a portion of the coverage region of the other autonomous robot to be assigned to the autonomous robot 11. Furthermore, the route information may be generated by the autonomous robot 11 itself, for example.

The task-complete region information is information indicating, for example, a map or the area of the coverage region 21 that has been completed up to that point in time. More specifically, the task-complete region information indicates information relating to the regions of tasks that have already been executed by the autonomous robot 11 from within the coverage region 21 assigned to the autonomous robot 11. Here, the task-complete region information is generated as follows. Specifically, while the autonomous robot 11 is executing tasks, the control unit 112 instructs the location measurement unit 117 such that location information of the autonomous robot 11 is periodically tracked and a movement locus of the autonomous robot 11 is acquired. The control unit 112 then deems the acquired movement locus to constitute regions of tasks that have been executed by the autonomous robot 11, thereby generating task-complete region information.

The task-incomplete region information is information indicating, for example, a map or the area of the coverage region 21 that has not yet been completed. More specifically, the task-incomplete region information indicates information relating to the regions of tasks that have not yet been executed by the autonomous robot 11 from within the coverage region 21 assigned to the autonomous robot 11. Here, the task-incomplete region information is generated by task-complete regions indicated in the task-complete region information being differentiated from the coverage region 21 assigned to the autonomous robot 11, for example.

The task start time is information indicating the time at which the autonomous robot 11 started a task. The task start time is acquired by the time measurement unit 116, which is instructed by the control unit 112, immediately before the autonomous robot 11 starts the execution of a task.

The expected task end time is information indicating the time at which the autonomous robot 11 will complete a task. More specifically, the expected task end time is information indicating the expected time at which the autonomous robot 11 will complete a task assigned thereto. The expected task end time changes dynamically according to the progress of the tasks of the autonomous robot.

For example, the expected task end time for the point in time at which the autonomous robot 11 started a task is calculated as follows by the control unit 112. First, the control unit 112 calculates the required time necessary for task execution on the basis of the area of the coverage region 21 included in the region information and the specification information of the local robot information 1151 stored in the storage unit 115. Furthermore, the control unit 112 instructs the time measurement unit 116 to acquire a task start time.

The control unit 112 then uses the acquired task start time and the calculated required time necessary for task execution to calculate the time at which the required time will have elapsed from the task start, as the expected task end time.

Furthermore, for example, the expected task end time for any point in time at which the autonomous robot 11 is executing a task is calculated as follows. First, the control unit 112 instructs the time measurement unit 116 to acquire time information, and uses the task start time of the local robot information 1151 stored in the storage unit 115 to calculate the required task time up to that point in time. The control unit 112 calculates a task processing amount per unit time for the execution of tasks up to that point in time, in accordance with the area of the task-complete region included in the task-complete region information of the local robot information 1151 stored in the storage unit 115 and the calculated required task time. Next, the control unit 112 calculates the required task time for executing the tasks of the task-incomplete region from that point in time, in accordance with the area of the task-incomplete region included in the task-incomplete region information of the local robot information 1151 stored in the storage unit 115, and the calculated task processing amount per unit time. The control unit 112 then uses the acquired time information and the calculated required task time for the task-incomplete region to calculate the time at which the required task time will have elapsed from the acquired time information, as the expected task end time.

The task execution amount per unit time is information indicating a task processing amount or the like per unit time that represents the average amount of tasks executed per unit time by the autonomous robot 11. The task processing amount per unit time is the average task processing amount per unit time for when the autonomous robot 11 executes the tasks for the coverage region 21.

Here, the task processing amount per unit time for when a task is actually executed is calculated as follows, for example. First, the control unit 112 instructs the time measurement unit 116 to acquire time information at any point in time at which the autonomous robot 11 is executing a task. The control unit 112 calculates the required task time up to that point in time in accordance with the acquired time information and the task start time of the local robot information 1151 stored in the storage unit 115. The control unit 112 then calculates an actual task execution amount per unit time by dividing the area of the task-complete region included in the task-complete region information of the local robot information 1151 stored in the storage unit 115, by the calculated required task time.

It should be noted that the task execution amount per unit time is different from the aforementioned specification information. The task processing amount per unit time included in the specification information is preset information that indicates a task processing amount per unit time for when the autonomous robot 11 carries out a task with respect to a region in which there are no obstacles whatsoever. However, the actual task processing amount per unit time indicates a task processing amount per unit time for when the autonomous robot 11 has actually executed a task for the coverage region 21. In the coverage region 21 in which the autonomous robot 11 actually executes tasks, there are objects and it is necessary for the autonomous robot 11 to make detours to execute the tasks, and therefore it is assumed that the task cannot be executed at the task processing amount per unit time included in the specification information. Furthermore, there are individual differences in autonomous robots, and, even in the case where there are no objects in the coverage region 21, it is assumed that the task cannot be executed at the task processing amount per unit time included in the specification information. Therefore, the task processing amount per unit time for when the task is actually executed is a different value from the task processing amount per unit time of the specification information.

(Details of the Other Robot Information)

The other robot information 1152 includes information relating to other autonomous robots, and includes information stored in the storage unit 115 on the basis of information received from other autonomous robots by the autonomous robot 11.

For example, as depicted in FIG. 4, the other robot information 1152 includes, for each of the other autonomous robots, robot-specific information, location information, an expected task end time, task-incomplete region information, and a task execution amount per unit time for the other autonomous robot in question. In the present embodiment, the other robot information 1152 includes robot-specific information, location information, an expected task end time, task-incomplete region information, and a task execution amount per unit time for each of the other autonomous robots 12, 13, and 14.

It should be noted that the information included in the other robot information 1152 is not restricted to the aforementioned examples. Distance information regarding the distance between the autonomous robot 11 and another autonomous robot and information relating to the progress of the tasks of the other autonomous robot may be included as information required for the autonomous robot 11 to cooperate with the other autonomous robot. For example, the other robot information 1152 may include robot-specific information, location information, and an expected task end time for each of the other autonomous robots. Furthermore, distance information indicating the distance from the autonomous robot 11 to another autonomous robot may be included instead of location information. The distance information can be calculated using the location information of the autonomous robot 11 and the location information of the other autonomous robot.

Furthermore, even in the case where the task execution amount per unit time is not able to be included as information forming part of the other robot information 1152, a task start time, the required time for a task up to a certain point in time, and task-complete region information may be included. In the case where the task execution amount per unit time of another autonomous robot is required, the task execution amount per unit time can be calculated using the aforementioned information.

(Details of the Selection Standard)

The selection standard 1153 is stored in the storage unit 115 and indicates information (a selection standard) indicating which other autonomous robot is to be selected as a support-target candidate in the case where information of a plurality of other autonomous robots is included in the other robot information 1152. For example, the selection standard 1153 may indicate that the other autonomous robot (second robot) having the largest amount of remaining tasks acquired by the control unit 112 from within a robot group, which is a plurality of other autonomous robots with which it is possible for the autonomous robot 11 (first robot) to communicate, is to be selected as the support-target robot. Furthermore, the selection standard 1153 may include frequency information indicating a frequency limit that is the number of times that the support-target robot can be altered.

In the present embodiment, a description is given in which the selection standard 1153 indicates that the autonomous robot having the latest expected task end time is to be selected as a support-target candidate (selection standard). According to this election standard, the autonomous robot 11, which has completed the tasks therefor, is able to support the other autonomous robot having the latest expected task end time from among the information of the plurality of other autonomous robots stored in the storage unit 115. It is thereby possible to advance the expected task end time of the entirety of the robot system 1.

It should be noted that the selection standard 1153 differs according to the content required for the robot system 1, and therefore may be set dynamically. Accordingly, it becomes possible to alter the information included in the selection standard 1153 in accordance with the requirements necessary for the robot system 1, and it therefore becomes possible for the autonomous robot 11 to cooperate with the other autonomous robots to a greater extent to execute tasks.

Furthermore, the selection standard 1153 is not restricted to the aforementioned example.

For example, in the case where priority levels are given to tasks to which autonomous robots are assigned, the selection standard 1153 may indicate that the other autonomous robot having the task of the highest priority level is to be prioritized and selected as a support-target candidate. The autonomous robot 11 is thereby able to preferentially support the other autonomous robot having the task of the highest priority level, and it therefore becomes possible for the task of the highest priority level to be quickly completed.

Furthermore, for example, the selection standard 1153 may indicate that the other autonomous robot having the shortest distance to the autonomous robot 11 is to be selected as a support-target candidate. The autonomous robot 11 is thereby able to minimize the movement time required to travel to provide support, and it therefore becomes possible to increase the task execution operation rate of the autonomous robot 11.

Furthermore, for example, the selection standard 1153 may indicate that the other autonomous robot for which tasks will be completed the quickest due to the autonomous robot 11 providing support is to be selected. Thus, the autonomous robot 11 selects the other autonomous robot for which tasks will be completed the quickest if the autonomous robot 11 provides support, from among the other autonomous robots included in the other robot information of the storage unit 115, and it therefore becomes possible to increase the number of other autonomous robots for which tasks will be completed at an earlier time. That is, according to this selection standard, it becomes possible to more quickly increase the number of autonomous robots which can provide support.

Figures 5, 6:
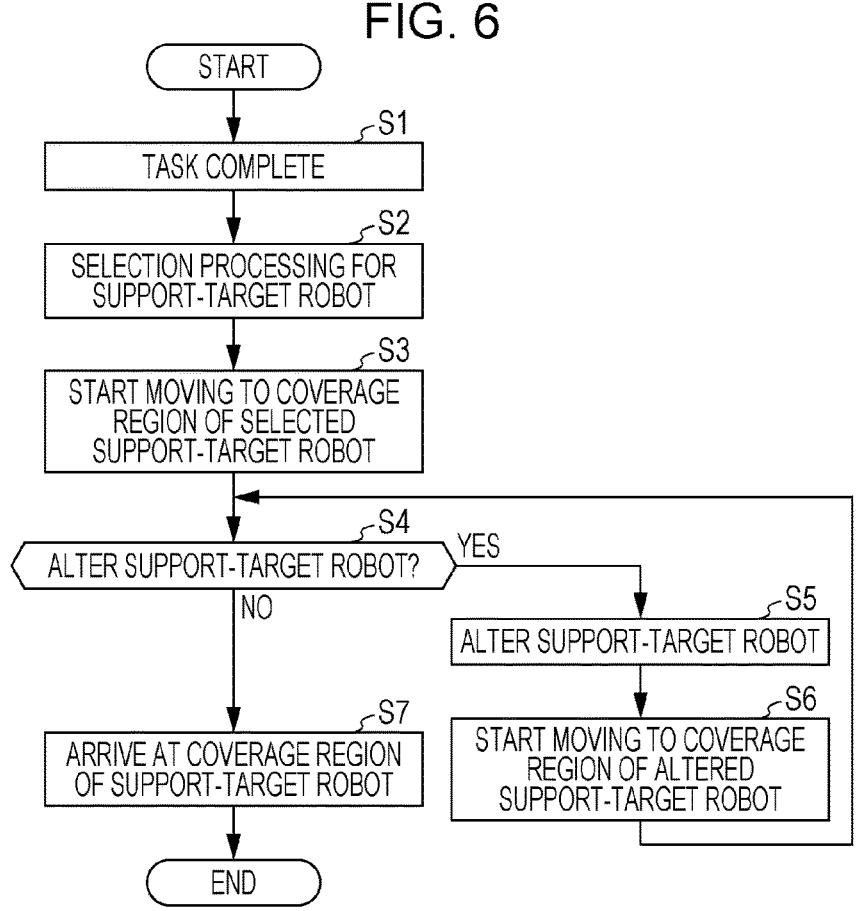
FIG. 5 is a drawing depicting an example of other robot information depicted in FIG. 4.
FIG. 6 is a flowchart for describing an operation of an autonomous robot in embodiment 1.

FIG. 5 is a drawing depicting an example of the other robot information 1152 depicted in FIG. 4.

FIG. 5 depicts an example of the other robot information 1152 stored in the storage unit 115 on the basis of information received from each of the other autonomous robots 12, 13, and 14, which are within the communication range 311, due to the autonomous robot 11 communicating with the other autonomous robots 12, 13, and 14 in the situation depicted in FIG. 1. It should be noted that FIG. 1 depicts, as an example, the situation when the autonomous robot 11 has completed the tasks assigned thereto as described above. Here, the time when the autonomous robot 11 has completed the tasks assigned thereto is taken as 13:30:00, and the location information of the autonomous robot 11 at such time is taken as a starting point, namely (0, 0).

[Operation of Autonomous Robot]

Next, an overview of the operation of the autonomous robot 11 configured as described above will be described.

FIG. 6 is a flowchart for describing the operation of the autonomous robot 11 according to embodiment 1.

First, the autonomous robot 11, when the tasks assigned thereto have been completed (S1), performs selection processing for a support-target robot (S2). More specifically, in the case where the autonomous robot 11, which is a first robot from among a plurality of autonomous robots, has completed tasks with respect to the coverage region 21 (first coverage region) assigned to the autonomous robot 11 (first robot), the autonomous robot 11 performs selection processing to select a support-target robot from within a robot group, which is a plurality of autonomous robots other than the first robot that are able to communicate with the autonomous robot 11 (first robot) from among the plurality of autonomous robots.

Next, the autonomous robot 11 starts moving toward the coverage region of the selected support-target robot (S3). More specifically, the autonomous robot 11 (first robot) starts moving toward a second coverage region assigned to a second robot, which is the support-target robot selected by means of the selection processing of S2.

Next, the autonomous robot 11 determines whether to alter the support-target robot (S4). More specifically, in the case where it has become newly possible to communicate with a third robot from among the plurality of autonomous robots while moving toward the second coverage region, the autonomous robot 11 (first robot) determines whether to alter the support-target robot to the third robot.

In the case where it is determined in S4 that the support-target robot is to be altered (yes in S4), the autonomous robot 11 alters the support-target robot (S5), and starts moving toward the coverage region of the altered support-target robot (S6). More specifically, in the case where it is determined that the support-target robot is to be altered from the second robot to the third robot, the autonomous robot 11 (first robot) starts moving toward a third coverage region assigned to the third robot. The autonomous robot 11 then performs the processing of S4 once again.

However, in S4, in the case where it is determined that the support-target robot is not to be altered (no in S4), the autonomous robot 11 continues to move toward the coverage region (second coverage region) of the support-target robot, and the present processing ends upon arriving at said coverage region (S7). The autonomous robot 11 then supports the support-target robot with the tasks with respect to the coverage region at which the autonomous robot 11 has arrived.

(Details of the Selection Processing)

Next, the details of the selection processing of S2 will be described using the drawings.

Figure 7:
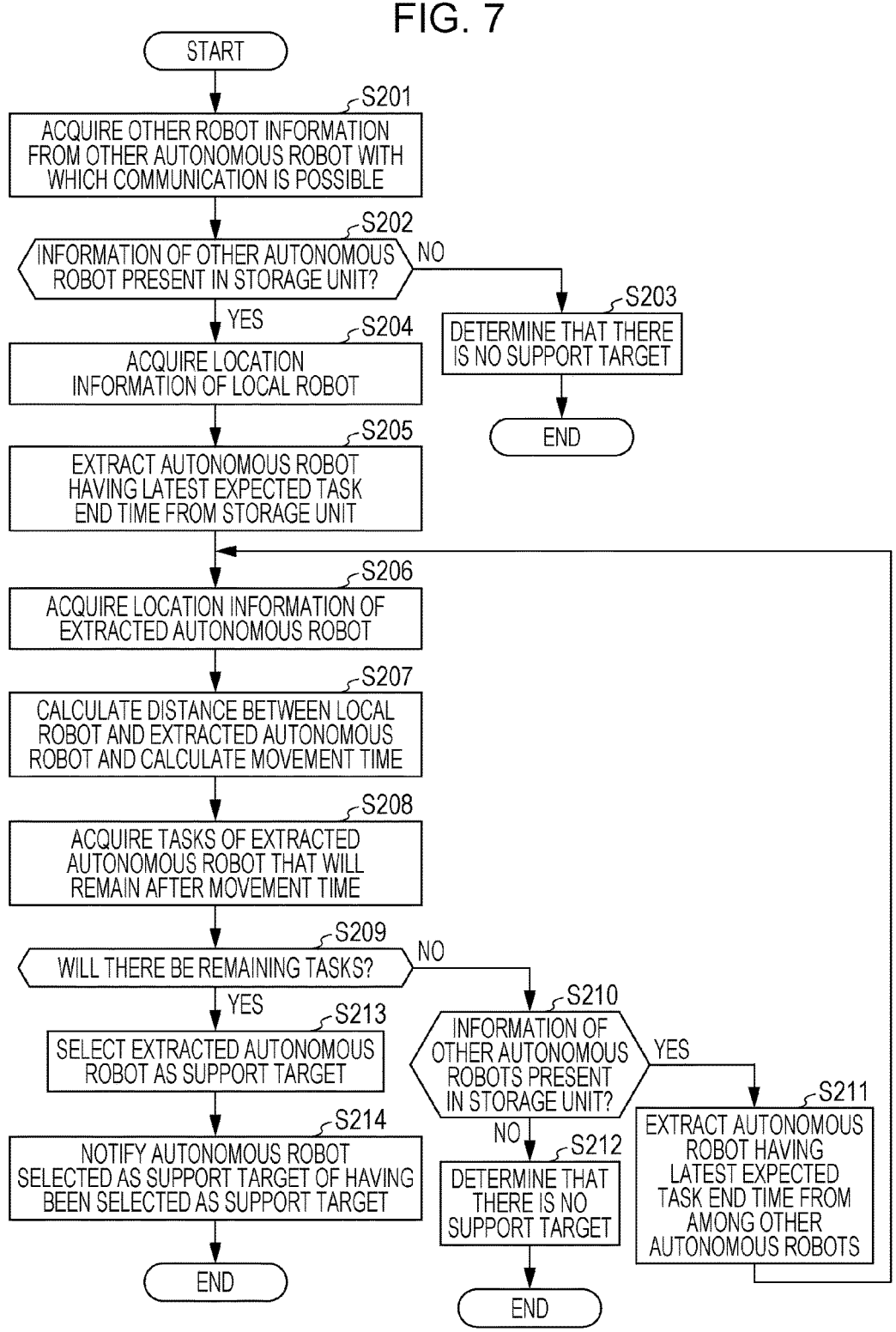
FIG. 7 is a flowchart for describing a detailed example of selection processing of an autonomous robot in embodiment 1.

FIG. 7 is a flowchart for describing a detailed example of the selection processing of the autonomous robot 11 in embodiment 1. FIG. 7 depicts an example of the selection processing of S2 in which the autonomous robot 11 selects a support-target autonomous robot.

Hereinafter, a description will be given regarding a specific example of the selection processing in which the autonomous robot 11 selects a cooperation partner therefor, namely another autonomous robot to be a support target for the autonomous robot 11, on the basis of the other robot information 1152 when having completed the tasks assigned thereto.

Here, the autonomous robot 11 has completed tasks in the situation depicted in FIG. 1, the time at which the autonomous robot 11 completed the tasks assigned thereto is taken as 13:30:00, and the location information of the autonomous robot 11 is taken as (0, 0). Furthermore, it is assumed that the other robot information depicted in FIG. 4 is stored in the storage unit 115, and that a movement speed of 10 m/min. for the autonomous robot 11 is included in the specification information of the autonomous robot 11. The autonomous robot 11 starts the selection processing to select a support-target robot when having completed the tasks for the coverage region 21 assigned thereto.

First, the autonomous robot 11 acquires other robot information from other autonomous robots with which communication is possible (S201). In the present embodiment, the autonomous robot 11 communicates with each of the other autonomous robots 12, 13, and 14 that are present in the communication range 311 thereof as depicted in FIG. 1, and receives robot-specific information that includes robot identification information and specification information, task information that is information relating to tasks, and location information of the autonomous robots, from each of the other autonomous robots 12, 13, and 14. On the basis of the information received from the other autonomous robots, the autonomous robot 11 stores the other robot information 1152, which includes robot-specific information, location information, an expected task end time, task-incomplete region information, and a task execution amount per unit time as depicted in FIG. 4, for example, in the storage unit 115.

In the present embodiment, the autonomous robot 11 acquires the information of other autonomous robots themselves from the other autonomous robots; however, it should be noted that the present disclosure is not restricted thereto. The autonomous robot 11 may also additionally acquire the information of different autonomous robots possessed by the other autonomous robots. In this case, the autonomous robot 11 is able to acquire the information of a greater number of other autonomous robots, and it therefore becomes possible to select a support-target robot in a more appropriate manner.

Next, the autonomous robot 11 determines whether the information of another autonomous robot is present in the storage unit 115 (S202). It should be noted that, in this processing, the autonomous robot 11 determines whether information from another autonomous robot has been acquired.

In S202, in the case where the information of another autonomous robot is not present in the storage unit 115 (no in S202), it is determined that there is no other autonomous robot to be a support-target robot (S203), and processing ends. Here, the case where the information of another autonomous robot is not present in the storage unit 115 corresponds to the case where, in the processing of S201, the autonomous robot 11 has not been able to acquire information from another autonomous robot, and does not possess the information of another autonomous robot.

However, in S202, in the case where the information of another autonomous robot is present in the storage unit 115 (yes in S202), processing advances to S204. In the present embodiment, in S201, the autonomous robot 11 acquires information from the other autonomous robots, and, in the case where the information of the other autonomous robots is stored in the storage unit 115, determines that there are autonomous robots to be support-target candidates.

Then, in S201 to S213, the autonomous robot 11 starts processing for choosing another autonomous robot to be a support-target candidate, and determining whether the other autonomous robot is appropriate as a support target. In the present embodiment, as depicted in FIG. 4, the autonomous robot 11 possesses the information of the other autonomous robots 12, 13, and 14, and therefore starts processing for choosing an autonomous robot to be a support-target candidate from thereamong and determining whether that autonomous robot that is to be a support-target candidate is appropriate as a support target.

First, in S204, the autonomous robot 11 uses the location measurement unit 117 to acquire current location information of the autonomous robot 11. In the present embodiment, the location information of the autonomous robot 11 at the point in time of having completed the tasks is (0, 0), and therefore the location information (0, 0) of the autonomous robot 11 is acquired using the location measurement unit 117.

Next, in S205, the autonomous robot 11 extracts, from the storage unit 115, the robot having the latest expected task end time that conforms with the selection standard 1153. In the present embodiment, first, the autonomous robot 11 acquires information of another autonomous robot to be a support-target candidate from the other robot information 1152 in the storage unit 115. Next, since information of a plurality of other autonomous robots is included in the other robot information 1152 in the storage unit 115, the autonomous robot 11 extracts another autonomous robot to be a support-target candidate in accordance with the selection standard 1153. Here, as described above, the selection standard 1153 indicates that the other autonomous robot having the latest expected task end time is to be selected as a support-target candidate. Therefore, in accordance with this selection standard 1153, the autonomous robot 11 extracts information of the autonomous robot 14, which is the other autonomous robot having the latest expected task end time, from the other robot information 1152 in the storage unit 115 depicted in FIG. 4.

Next, in S206, the autonomous robot 11 acquires the location information of the other autonomous robot extracted. In the present embodiment, the autonomous robot 11 acquires location information (30, 40) of the autonomous robot 14 such as that depicted in FIG. 5, from the other robot information of the autonomous robot 14 extracted in S205.

Next, in S207, the autonomous robot 11 calculates the distance to the other autonomous robot extracted, and calculates a movement time. In the present embodiment, the autonomous robot 11 uses the Pythagorean theorem to calculate a movement distance of 50 m in accordance with the location information (0, 0) of the autonomous robot 11 acquired in S204 and the location information (30, 40) of the autonomous robot 14 extracted in S206. The autonomous robot 11 then divides the calculated movement distance of 50 m by the movement speed of 10 m/min. included in the specification information of the autonomous robot 11 to thereby calculate a movement time of 5 min.

Next, in S208, the autonomous robot 11 acquires the tasks of the extracted other autonomous robot that will be remaining after having moved. In the present embodiment, first, the autonomous robot 11 calculates a movement time task amount that will be executed by the autonomous robot 14 during the movement time required for the autonomous robot 11 to move to the autonomous robot 14 extracted in S205 or the coverage region of the autonomous robot 14. Here, the task processing amount per unit time of the autonomous robot 14 is 1/min. according to FIG. 5 and the movement time calculated in S207 is 5 min., and therefore the autonomous robot 11 multiplies those values to calculate a movement time task amount of 5. Next, the autonomous robot 11 calculates the amount of tasks of the autonomous robot 14 that will be remaining after the movement time. Here, the amount of remaining tasks of the autonomous robot 14 before the autonomous robot 11 moves, namely the task-incomplete region, is 36 according to FIG. 5. Furthermore, the movement time task amount of the autonomous robot 14 is 5. Consequently, the autonomous robot 11 is able to calculate that the amount of remaining tasks of the autonomous robot 14 for when the autonomous robot 11 will have finished moving is 31, by subtracting the movement time task amount of 5, which is the amount of tasks executed by the autonomous robot 14 while the autonomous robot 11 is moving, from the amount of remaining tasks of 36 of the autonomous robot 14 from prior to the autonomous robot 11 moving.

Next, in S209, the autonomous robot 11 determines whether there will be remaining tasks. In the present embodiment, the autonomous robot 11 determines whether there will be more than 0 tasks remaining for the autonomous robot 14 after moving. This determination processing is a determination as to whether the tasks of the autonomous robot 14 will be completed during the movement in which the autonomous robot 11 moves toward the autonomous robot 14 to provide support.

In S209, in the case where the amount of remaining tasks is 0 or less, namely that there are no remaining tasks (no in S209), the autonomous robot 11 determines whether the information of yet other autonomous robots is present in the other robot information 1152 in the storage unit 115 (S210). Here, the case where the amount of remaining tasks is 0 or less corresponds to the case where the tasks of the support-target autonomous robot will have been completed while the autonomous robot 11 is moving thereto to provide support, and therefore the autonomous robot 11 determines that support for the support-target autonomous robots is not required. It should be noted that, in S210, in the case where the information of yet other autonomous robots is not present in the other robot information 1152 in the storage unit 115 (no in S210), the autonomous robot 11 determines that there is no other autonomous robot to be a support target (S212), and processing ends. However, in S210, in the case where the information of yet other autonomous robots is present in the other robot information 1152 in the storage unit 115 (yes in S210), the autonomous robot having the latest expected task end time is extracted from among the information of the yet other autonomous robots (S211), and processing advances to S206.

However, in S209, in the case where the amount of remaining tasks is greater than 0 (yes in S209), the autonomous robot 11 determines the extracted other autonomous robot as a support target (S213). In the present embodiment, the amount of remaining tasks of the autonomous robot 14 is 31, which is greater than 0, and therefore the autonomous robot 11 determines that a task-incomplete region will be present at the autonomous robot 14 when having arrived at the autonomous robot 14 or the like (after having completed moving). In this way, the autonomous robot 11 is able to determine that the autonomous robot 14 is appropriate as another support-target autonomous robot.

Next, the autonomous robot 11 notifies the other autonomous robot selected as a support target that the other autonomous robot has been selected as a support target (S214).

In the present embodiment, upon selecting the support-target autonomous robot 14, the autonomous robot 11 starts moving toward the autonomous robot 14 in order to cooperate with the autonomous robot 14 to execute the tasks of the autonomous robot 14. At such time, the autonomous robot 11 notifies the autonomous robot 14 with information indicating that the autonomous robot 11 is coming to provide support.

The autonomous robot 14 is thereby able to confirm that the autonomous robot 11 is coming to provide support, and is able to complete tasks earlier than the current expected task end time. Furthermore, when information relating to tasks is requested from another autonomous robot, the autonomous robot 14 is able to provide the other autonomous robot with information including the point that its tasks will be completed earlier than expected due to the autonomous robot 11 coming to provide support. Accordingly, the other autonomous robot is able to select a support-target autonomous robot with consideration being given to the information received from the autonomous robot 14. In other words, the other autonomous robot is able to select a support-target autonomous robot in a more appropriate manner on the basis of the information received from the autonomous robot 14, and therefore the cooperation between autonomous robots is able to function in a more appropriate manner across the entirety of the robot system 1.

Furthermore, in the case where the autonomous robot 11 notifies the autonomous robot 14 with information indicating that the autonomous robot 11 is coming to provide support, the autonomous robot 14 may, in addition, determine a coverage region for which support is to be received and notify such to the autonomous robot 11 while the autonomous robot 11 is moving toward the autonomous robot 14. It thereby becomes possible for the autonomous robot 11 to move directly to the coverage region of the autonomous robot 14 to be handled by the autonomous robot 11 instead of moving to the current location of the autonomous robot 14. Furthermore, it becomes possible for the autonomous robot 11 to generate, in advance, which kind of route is to be taken through the coverage region of the autonomous robot 14 to be handled thereby.

It is assumed that S214 is performed when the autonomous robot 11 is moving; however, it should be noted that the present disclosure is not restricted thereto, and S214 may be performed when an autonomous robot has determined another autonomous robot as a support target. Furthermore, the autonomous robot 11 may not perform S214.

Furthermore, the information notified by the autonomous robot 11 in S214 may include the expected task end time for when the autonomous robot 11 has provided support. The expected task end time for when the autonomous robot 11 has provided support can be calculated by, for example, using the required time for when the amount of remaining tasks calculated in S208 is to be carried out by both the autonomous robot 11 and the autonomous robot 14, and the expected time for the autonomous robot 11 to arrive at the autonomous robot 14 or the like, to calculate the time at which the required time will have elapsed from the expected time.

Furthermore, the present disclosure is not restricted to the case where the autonomous robot 11 calculates the expected task end time, and the autonomous robot 14 may calculate the expected task end time.

Furthermore, the autonomous robot 11 may execute tasks for a coverage region of another autonomous robot while moving toward the support-target autonomous robot 14. For example, in the case where there is a task-incomplete region of another autonomous robot in the movement route along which the autonomous robot 11 will move toward the support-target autonomous robot 14, the autonomous robot 11 may move while executing the tasks for said task-incomplete region. Thus, the tasks for the task-incomplete region of the other autonomous robot are executed, and therefore the amount of tasks of the other autonomous robot decrease, and the other autonomous robot is able to complete its tasks earlier.

Due to the aforementioned selection processing, the autonomous robot 11, after having completed the tasks for the coverage region 21 assigned thereto, is able to select any of the other autonomous robots 12, 13, and 14 as a support-target autonomous robot on the basis of information obtained by communicating with the autonomous robots 12, 13, and 14. It thereby becomes possible for the autonomous robot 11 to provide support for a portion of the tasks of the support-target autonomous robot selected by means of the selection processing.

(Details of the Alteration Processing)

Next, the details of the alteration processing indicated in S4 of FIG. 6 will be described using the drawings.

Figure 8:
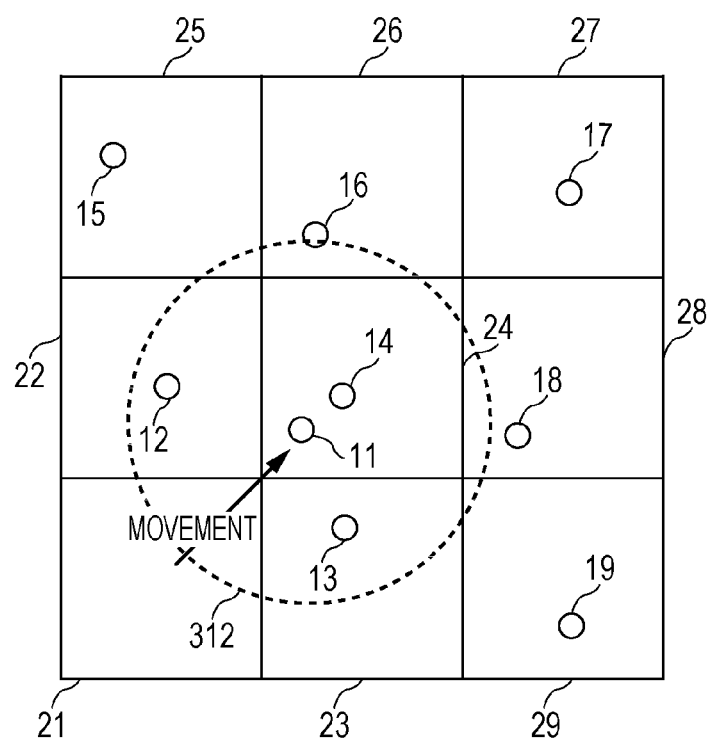
FIG. 8 is a drawing conceptually depicting a situation in which an autonomous robot in embodiment 1 has newly detected an autonomous robot while moving toward a support-target autonomous robot.

FIG. 8 is a drawing conceptually depicting a situation in which the autonomous robot 11 according to embodiment 1 has newly detected another autonomous robot while moving toward a support-target autonomous robot. FIG. 8 depicts a situation in which, as an example, the autonomous robot 11 has newly detected an autonomous robot 16 while moving toward the autonomous robot 14.

As described above, the autonomous robot 11, after having completed the tasks for the coverage region 21 assigned thereto, performs selection processing in which an autonomous robot to be a support target is selected on the basis of information received from each of the autonomous robots 12, 13, and 14 that are within a communication range 312. The autonomous robot 11 then starts moving in order to support the other autonomous robot selected by means of the selection processing. Due to this movement, the communication range of the autonomous robot 11 also moves, and therefore the autonomous robot 11 becomes unable to communicate with other autonomous robots with which communication had been possible up to that point in time, and becomes able to communicate with other new autonomous robots.

Hereinafter, the autonomous robot 11 performs alteration processing in which a determination is made as to whether the support-target autonomous robot is to be altered, with consideration being given also to information acquired from the autonomous robot 16 with which communication has become newly possible due to the movement as depicted in FIG. 8; this is described hereinafter.

Figure 9:
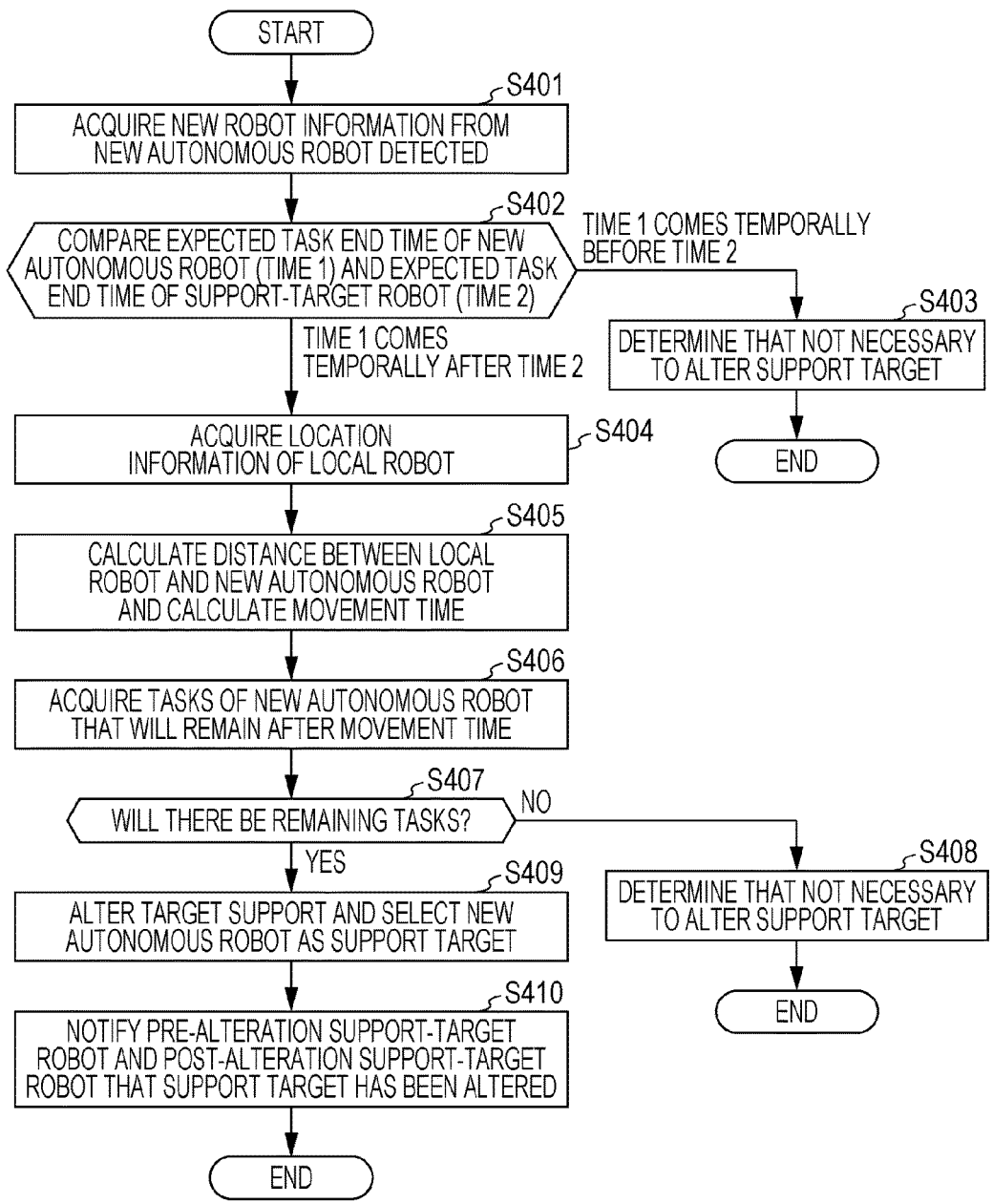
FIG. 9 is a flowchart for describing a detailed example of alteration processing performed by an autonomous robot in embodiment 1.

FIG. 9 is a flowchart for describing a detailed example of the alteration processing performed by the autonomous robot 11 in embodiment 1. FIG. 9 depicts an example of the case where the autonomous robot 11 newly detects another autonomous robot while moving toward the support-target autonomous robot, and performs the alteration processing of S4.

First, the autonomous robot 11 acquires other robot information from the new autonomous robot detected (S401). In the present embodiment, the autonomous robot 11 newly detects the autonomous robot 16 while moving to provide support to the autonomous robot 14. Thereupon, the autonomous robot 11 communicates with the autonomous robot 16 to acquire the other robot information, in other words, robot-specific information that includes robot identification information and specification information of the autonomous robot 16, task information that is information relating to tasks, and location information of the autonomous robot 16.

Next, the autonomous robot 11 compares the expected task end time of the new autonomous robot (time 1) and the expected task end time of the support-target autonomous robot (time 2) (S402). In the present embodiment, the autonomous robot 11 compares the acquired expected task end time of the autonomous robot 16 and the expected task end time of the support-target autonomous robot 14 stored in the other robot information 1152 in the storage unit 115.

It should be noted that there is also a possibility of the task progress status of the autonomous robot 14 having changed while the autonomous robot 11 has been moving toward the support-target autonomous robot 14. Therefore, in the case where communication with the autonomous robot 14 is possible, the autonomous robot 11 may communicate with the autonomous robot 14 to acquire other robot information that is the most up-to-date. It thereby becomes possible for the autonomous robot 11 to perform support-target alteration processing in a more appropriate manner.

Furthermore, in embodiment 1, the selection standard 1153 indicates that the autonomous robot having the latest expected task end time is to be selected as a support target, and therefore a comparison is performed using the expected task end time parameter. It should be noted that the parameter used in S402 is different if the content of the selection standard indicated in the selection standard 1153 is different. For example, in the case where the selection standard 1153 indicates that the autonomous robot carrying out the task having the highest priority level is to be selected as a support target, a task priority level may be used as the parameter. Furthermore, for example, in the case where the selection standard 1153 indicates that the autonomous robot having the shortest distance to an autonomous robot is to be selected as a support target, the distance to the autonomous robot may be used as the parameter.

In the case where time 1 comes temporally before time 2 in S402, the autonomous robot 11 determines that it is not necessary to alter the support target (S403), and processing ends. In the present embodiment, if the expected task end time of the newly detected autonomous robot 16 (time 1) comes temporally before the expected task end time of the autonomous robot 14 (time 2), the autonomous robot 11 determines that the autonomous robot 14 is more appropriate as the support target and it is not necessary to alter the support target, and processing ends. The autonomous robot 11 then resumes or continues moving toward the support-target autonomous robot 14 as planned.

However, in the case where time 1 comes temporally after time 2 in S402, the autonomous robot 11 determines that it is necessary to alter the support target, and processing proceeds to S404.

In the present embodiment, if the expected task end time of the newly detected autonomous robot 16 (time 1) comes temporally after the expected task end time of the support-target autonomous robot 14 (time 2), the autonomous robot 11 determines that there is a possibility of the autonomous robot 16 being more appropriate as the support target. Then, in S404 to S409, the autonomous robot 11 performs processing (verification processing) for determining whether the autonomous robot 16 is more appropriate as the support target. In this verification processing, in the case where it is assumed that the autonomous robot 11 is to move to the autonomous robot 16, a determination is made as to whether the task of the autonomous robot 16 will have been completed at the point in time at which the autonomous robot 11 will have arrived at the autonomous robot 16 or a coverage region 26 of the autonomous robot 16. Then, in the case where the task of the autonomous robot 16 will have been completed at said arrival time, it is determined that support for the autonomous robot 16 is not necessary. However, in the case where the task of the autonomous robot 16 will not have been completed at said arrival time, it is determined that the autonomous robot 16 is appropriate as a support target; this is described in detail hereinafter.

First, in S404, the autonomous robot 11 uses the location measurement unit 117 to acquire current location information of the autonomous robot 11.

Next, in S405, the autonomous robot 11 calculates the distance to the new autonomous robot, and calculates a movement time. In the present embodiment, the autonomous robot 11 calculates the movement distance between the autonomous robot 11 and the autonomous robot 16 according to the location information of the autonomous robot 16 acquired in S401 and the location information of the autonomous robot 11 acquired in S404. The autonomous robot 11 then calculates the movement time for the case where the autonomous robot 11 has moved to the autonomous robot 16, by dividing the calculated movement distance by the movement speed included in the specification information thereof. This processing is the same as that described in S207, and therefore a detailed description thereof is omitted.

Next, in S406, the autonomous robot 11 acquires the tasks of the new autonomous robot that will be remaining after the movement time. In the present embodiment, first, the autonomous robot 11 calculates the movement time task amount that will be executed by the autonomous robot 16 during the movement time calculated in S405. Next, the autonomous robot 11 calculates the amount of tasks of the autonomous robot 16 that will be remaining after the movement time. This processing is the same as that described in S208, and therefore a detailed description thereof is omitted.

Next, in S407, the autonomous robot 11 determines whether there will be tasks remaining for the new autonomous robot. In the present embodiment, the autonomous robot 11 determines whether there will be more than 0 tasks remaining for the autonomous robot 16 after the movement time.

In S407, in the case where the amount of remaining tasks of the new autonomous robot is 0 or less (no in S407), the autonomous robot 11 determines that it is not necessary to alter the support target (S408). In the present embodiment, in the case where the amount of remaining tasks is 0 or less, the autonomous robot 11 is able to determine that the tasks of the autonomous robot 16 will be completed while the autonomous robot 11 is moving toward the autonomous robot 16, and therefore determines that support for the autonomous robot 16 is not necessary. The autonomous robot 11 then resumes or continues moving toward the autonomous robot 14 as planned without altering the support-target autonomous robot.

However, in S407, in the case where the amount of remaining tasks is greater than 0 (yes in S407), the autonomous robot 11 alters the support target to the new autonomous robot (S409). In the present embodiment, in the case where the amount of remaining tasks of the autonomous robot 16 is greater than 0, the autonomous robot 11 determines that a task-incomplete region will be present at the autonomous robot 16 when the autonomous robot 11 has arrived at the autonomous robot 16 or the like (after having completed moving). In this way, the autonomous robot 11 determines that the autonomous robot 16 is more appropriate as the support target. The autonomous robot 11 then alters the support target from the autonomous robot 14 to the autonomous robot 16.

Next, the autonomous robot 11 notifies the pre-alteration support-target autonomous robot and the post-alteration support-target autonomous robot that the support target has been altered (S410).

In the present embodiment, when the support-target autonomous robot is altered to the autonomous robot 16 in S409, the autonomous robot 11 starts moving toward the altered support-target autonomous robot 16. At such time, the autonomous robot 11 notifies the autonomous robot 16 that has become the support target with information indicating that the autonomous robot 11 is coming to provide support, and notifies the autonomous robot 14 with information indicating that the autonomous robot 11 is not coming to provide support.

It is assumed that S410 is performed when the autonomous robot 11 is moving; however, it should be noted that the present disclosure is not restricted thereto, and S410 may be performed when an autonomous robot has altered a support target. Furthermore, the autonomous robot 11 may not perform S410.

According to the aforementioned alteration processing, in the case where there is an autonomous robot with which communication has become newly possible while the autonomous robot 11 is moving toward the support target selected in the selection processing, the autonomous robot 11 is able to perform support-target alteration processing on the basis of information from said autonomous robot. It thereby becomes possible for the autonomous robot 11 to select a more appropriate autonomous robot as a support target in the robot system 1, and it therefore becomes possible for the autonomous robot 11 to coordinate with other autonomous robots to execute tasks more efficiently.

[Effects, Etc.]

As described above, according to the present embodiment, a first robot that has completed a task with respect to an assigned coverage region is able to perform support-target alteration processing on the basis of information from a third robot with which communication has become newly possible when moving toward a second robot that is a support target, and is therefore able to select a more appropriate robot as a support target. It is thereby possible to realize a movement control method and a movement control device with which it is possible for an autonomous robot to cooperate with a greater number of other autonomous robots to execute tasks even in the case where the other autonomous robots with which communication is possible dynamically change.

In this way, according to the movement control method and the like of the present embodiment, an autonomous robot, after completing its own tasks, selects a support-target autonomous robot on the basis of information of other autonomous robots within a communication range, and, on the basis of information from an autonomous robot with which communication has newly become possible when moving toward the selected support-target autonomous robot, is able to perform a review of the support target and select a more appropriate support-target autonomous robot. It is thereby possible for the autonomous robot to coordinate with other autonomous robots to execute tasks more efficiently in the robot system.

Furthermore, according to the present embodiment, after the selection processing (in S214), the autonomous robot 11 notifies the selected support-target autonomous robot of having been selected as a support target. The support-target autonomous robot is thereby able to receive notification from the autonomous robot 11 that the autonomous robot 11 is coming to provide support, and issues a transmission to surrounding autonomous robots indicating that the task of the support-target autonomous robot will be completed quickly due to the support from the autonomous robot 11. Therefore, the autonomous robots surrounding the support-target autonomous robot are able to select support-target autonomous robots with consideration being given to the information transmitted by the aforementioned support-target autonomous robot, and it is therefore possible for the autonomous robots to coordinate to execute tasks more efficiently in the robot system 1.

Furthermore, according to the present embodiment, after the alteration processing (in S410), the autonomous robot 11 notifies the pre-alteration support-target autonomous robot and the post-alteration support-target autonomous robot that the support target has been altered. The pre-alteration support-target autonomous robot is thereby able to transmit accurate information to surrounding autonomous robots, and therefore the surrounding autonomous robots are able to select support-target autonomous robots on the basis of the accurate information.

Hypothetically, in the case where the autonomous robot 11 did not notify the pre-alteration support-target autonomous robot that the support target has been altered, a state would be entered in which the pre-alteration support-target autonomous robot does not know that the autonomous robot 11 is no longer coming to provide support. Therefore, the pre-alteration support-target autonomous robot would not be able to transmit information to the surrounding autonomous robots indicating that the autonomous robot 11 is no longer coming to provide support, and therefore the surrounding autonomous robots would select support-target autonomous robots under the mistaken perception that the autonomous robot 11 is coming to provide support to the autonomous robot 14. In this case, a state would entered in which the pre-alteration support-target autonomous robot does not receive support from not only the autonomous robot 11 but also the surrounding autonomous robots, and there is a possibility of the task of the pre-alteration support-target autonomous robot being completed late.

Furthermore, according to the present embodiment, it is possible to control the number of times that the alteration processing of the autonomous robot 11 is performed, and it is therefore possible to limit the autonomous robot 11 requiring a large amount of time to arrive at a support-target autonomous robot or the like and there being less time for actually supporting tasks due the support-target autonomous robot being altered numerous times.

(Embodiment 2)

In embodiment 1, a description was given regarding the case where, during selection processing, a support-target autonomous robot is selected from among a plurality of other autonomous robots with which communication is possible; however, the present disclosure is not restricted thereto. In embodiment 2, a description is given regarding an example of the case where an autonomous robot 11B selects a support-target autonomous robot from among other autonomous robots with which communication has been possible, while executing or after executing a task of the autonomous robot 11B.

[Functional Configuration of Autonomous Robot]

Hereinafter, as with embodiment 1, the functional configuration of the autonomous robot 11B will be representatively described.

Figure 10:
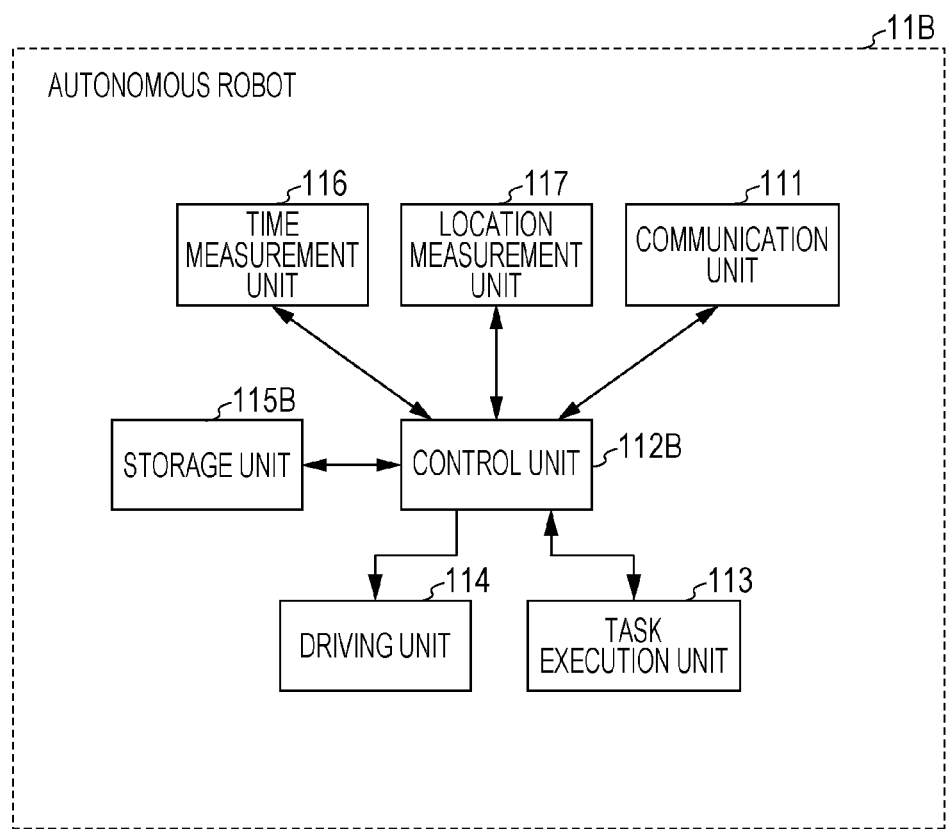
FIG. 10 is a block diagram depicting an example of the functional configuration of an autonomous robot in embodiment 2.

FIG. 10 is a block diagram depicting an example of the functional configuration of the autonomous robot 11B in embodiment 2. The same elements as in FIG. 2 are denoted by the same reference numbers, and a detailed description thereof is omitted.

The autonomous robot 11B depicted in FIG. 10 is different from the autonomous robot 11 depicted in FIG. 2 with regard to the configurations of a control unit 112B and a storage unit 115B.

[Control Unit 112B]

Figure 11:
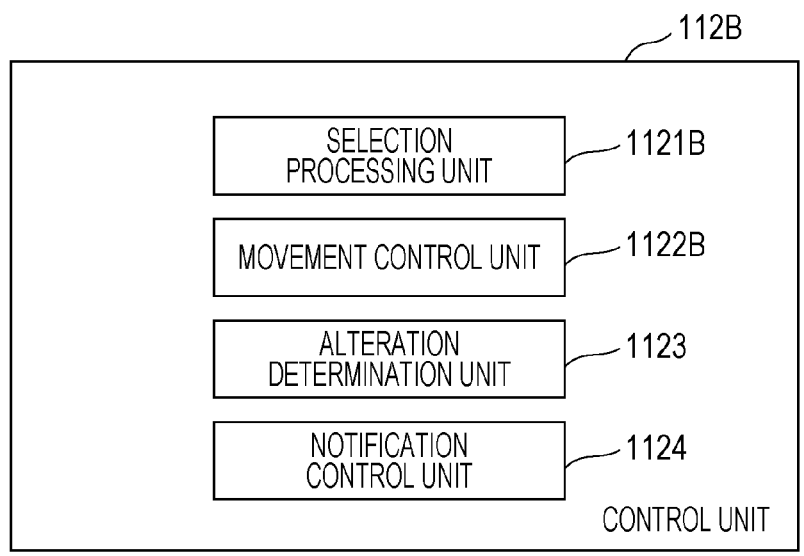
FIG. 11 is a block diagram depicting an example of the detailed configuration of a control unit depicted in FIG. 10.

FIG. 11 is a block diagram depicting an example of the detailed configuration of the control unit depicted in FIG. 10. The same elements as in FIG. 3 are denoted by the same reference numbers, and a detailed description thereof is omitted.

As depicted in FIG. 11, the control unit 112B is provided with a selection processing unit 1121B, a movement control unit 1122B, an alteration determination unit 1123, and a notification control unit 1124. The control unit 112B is different from the control unit 112 depicted in FIG. 3 with regard to the configurations of the selection processing unit 1121B and the movement control unit 1122B.

The selection processing unit 1121B is provided with the functions of the selection processing unit 1121. In addition, in the case where at least one item of information relating to a plurality of other autonomous robots stored in the storage unit 115B is received outside of a prescribed period that is based on the point in time at which tasks with respect to a coverage region 21 (first coverage region) have been completed, the selection processing unit 1121B instructs the movement control unit 1122B for the autonomous robot 11B (first robot) to be made to move within the coverage region 21 (within the first coverage region).

Furthermore, when it has become possible for the autonomous robot 11B (first robot) to communicate with another autonomous robot that corresponds to said at least one item of information while moving within the coverage region 21 (within the first coverage region), the selection processing unit 1121B receives other robot information of the other autonomous robot, and acquires the remaining tasks of each robot of a robot group that includes the other autonomous robot.

The movement control unit 1122B is provided with the functions of the movement control unit 1122. The movement control unit 1122B, in addition, causes the autonomous robot 11B (first robot) to move within the coverage region 21 (within the first coverage region) in accordance with the instruction from the selection processing unit 1121B. In the present embodiment, the movement control unit 1122B causes the autonomous robot 11B (first robot) to move within the coverage region 21 (with the first coverage region) toward a location indicated by reception location information of the autonomous robot 11B (first robot) from when having received the other robot information of the other autonomous robot.

[Storage Unit 115B]

Figure 12:
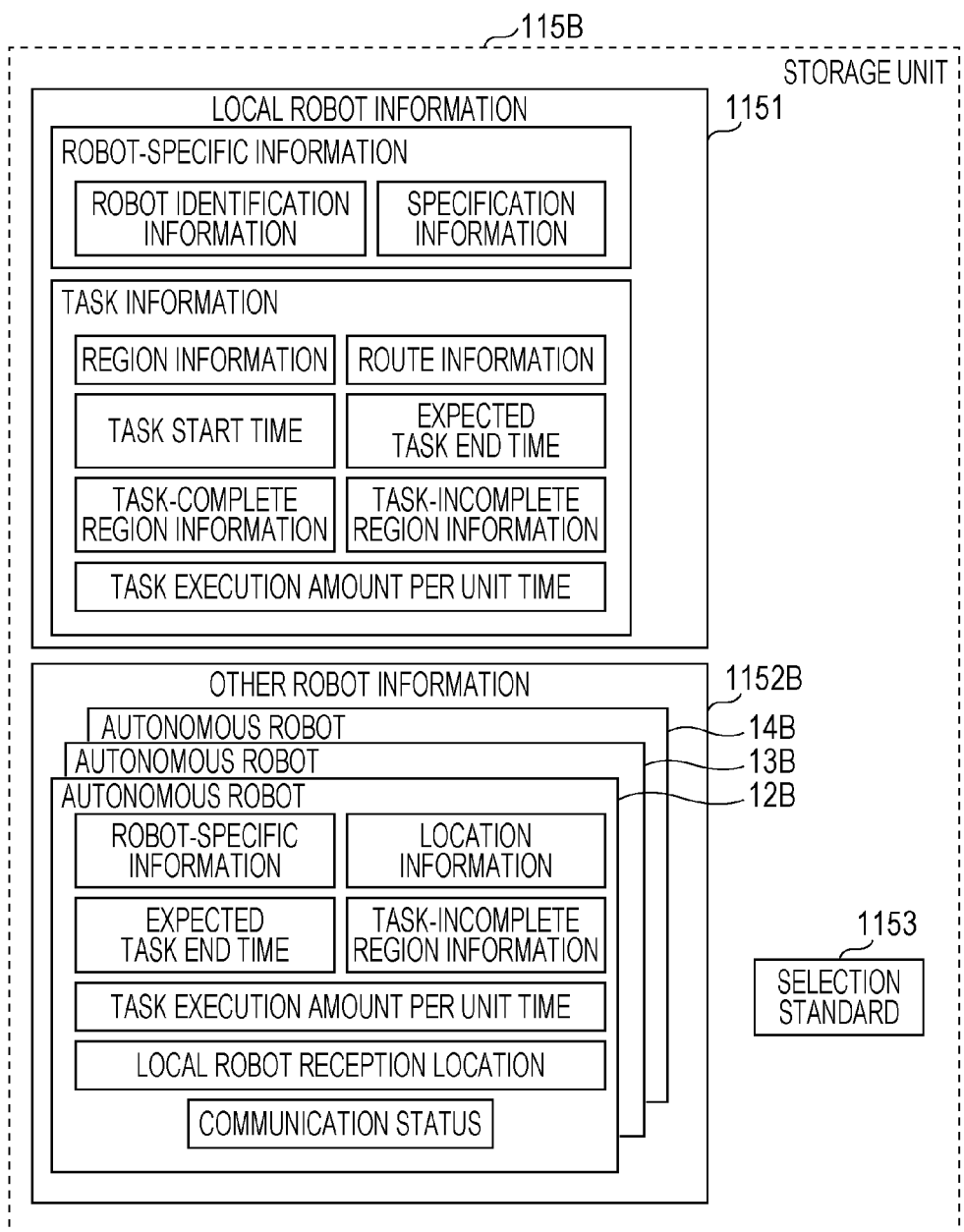
FIG. 12 is a drawing conceptually depicting information stored in a storage unit of an autonomous robot in embodiment 2.

Next, FIG. 12 will be used to describe the information stored in the storage unit 115B of the autonomous robot 11B.

FIG. 12 is a drawing conceptually depicting the information stored in the storage unit of an autonomous robot in embodiment 2. The same elements as in FIG. 4 are denoted by the same reference numbers, and a detailed description thereof is omitted.

As in embodiment 1, the storage unit 115B stores local robot information 1151, a selection standard 1153, and other robot information 1152B that is based on information transmitted from other autonomous robots.

The storage unit 115B is different from the storage unit 115 depicted in FIG. 4 with regard to the information that includes the other robot information 1152B. Furthermore, the storage unit 115B is different from the storage unit 115 depicted in FIG. 4 with regard to the autonomous robot 11B (first robot) storing the other robot information of other autonomous robots received while executing tasks with respect to the coverage region 21 (first coverage region). That is, in the present embodiment, the autonomous robot 11B, while executing tasks for the coverage region 21 thereof, periodically communicates with other autonomous robots within a communication range, and stores acquired other robot information of the other autonomous robots.

(Details of the Other Robot Information)

As depicted in FIG. 12, the other robot information 1152B includes information indicating a local robot reception location and a communication status in addition to the information included in the other robot information 1152 depicted in FIG. 4.

The local robot reception location is information that indicates the location (reception location) from when the autonomous robot 11B (first robot) has received other robot information from each of the other autonomous robots while executing tasks with respect to the coverage region 21 (first coverage region). In the present embodiment, the local robot reception location is the location information of the autonomous robot 11B acquired by the location measurement unit 117 when having received information from another autonomous robot, and is included in the other robot information. In this way, the local robot reception location and the other robot information corresponding thereto are associated. The communication status is information indicating the current communication status of each of the other autonomous robots.

It should be noted that although the other robot information 1152B does not include a task execution amount per unit time, this may be included. Furthermore, the other robot information 1152B may also include time information that indicates the time at which the autonomous robot 11B (first robot) has received the other robot information of each of the other autonomous robots.

FIG. 13 is a drawing depicting an example of the other robot information 1152B depicted in FIG. 12. The same elements as in FIG. 5 are denoted by the same reference numbers, and a detailed description thereof is omitted.

FIG. 13 depicts that the information of autonomous robots 12B, 13B, and 14B is stored as the other robot information 1152B in the storage unit 115B. Furthermore, FIG. 13 depicts that, at present, the autonomous robot 11B is able to communicate with the autonomous robots 13B and 14B but is unable to communicate with the autonomous robot 12B. It should be noted that the other robot information of the autonomous robot 12B was received when the autonomous robot 11B was previously able to communicate with the autonomous robot 12B.

The autonomous robot 11B configured as described above, when having completed the tasks therefor, selects another autonomous robot to be a support target, on the basis of the other robot information of other autonomous robots with which communication is currently possible, and other robot information acquired by once again communicating with other autonomous robots with which communication is currently not possible, from among the information of other autonomous robots stored while executing tasks.

[Operation of Autonomous Robot]

Next, an overview of the operation of the autonomous robot 11B configured as described above will be described.

Figure 14A:
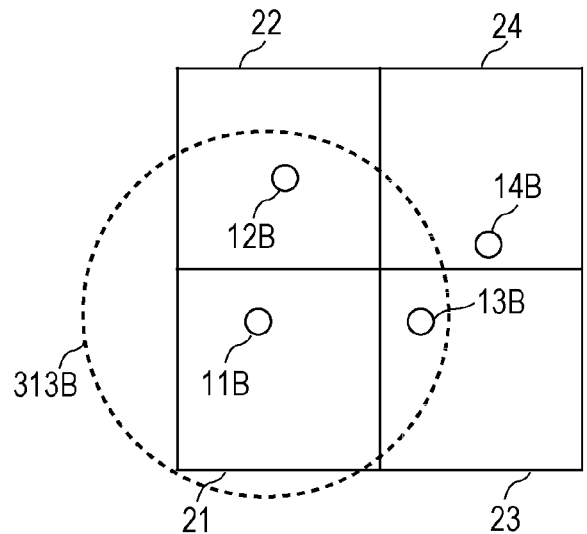
FIG. 14A is a drawing conceptually depicting a situation for autonomous robots that make up a robot system in embodiment 2.
Figure 14B:
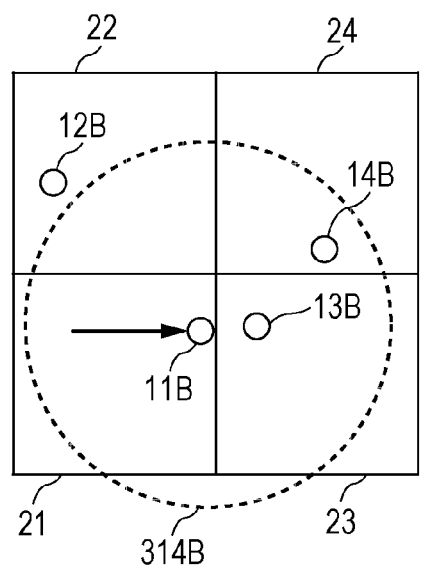
FIG. 14B is a drawing conceptually depicting a situation for autonomous robots that make up a robot system in embodiment 2.

FIGS. 14A and 14B are drawings conceptually depicting a situation for the autonomous robots that make up the robot system in embodiment 2. FIG. 14A depicts an example of a situation in which the autonomous robots 11B to 14B are executing tasks for coverage regions 21 to 24 assigned thereto. FIG. 14B depicts an example of the situation when the autonomous robot 11B has completed its tasks. The same constituent elements as in FIG. 1 are denoted by the same reference numbers, and a description thereof is omitted. It should be noted that a communication range 313B of FIG. 14A and a communication range 314B of FIG. 14B indicate communication ranges in which the autonomous robot 11B is able to communicate.

The autonomous robot 11B that is executing tasks as depicted in FIG. 14A is able to communicate with the autonomous robots 12B and 13B that are within the communication range 313B. However, as depicted in FIG. 14B, the autonomous robot 11B when having completed the tasks is able to communicate with the autonomous robots 13B and 14B that are within the communication range 314B but is not able to communicate with the autonomous robot 12B with which communication had been possible in FIG. 14A.

The autonomous robot 11B may use only the other robot information of the autonomous robots 13B and 14B with which communication is currently possible to select another autonomous robot to be a support target, but it is more desirable to use the other robot information of as many other autonomous robots as possible to more appropriately select another autonomous robot to be a support target. Therefore, in the present embodiment, in the selection processing indicated in S2, the autonomous robot 11B once again attempts to communicate also with other autonomous robots with which communication is currently not possible, to acquire other robot information to select another autonomous robot for a support target.

(Details of the Selection Processing)

Next, the details of the selection processing in the present embodiment will be described using FIG. 15.

Figure 15:
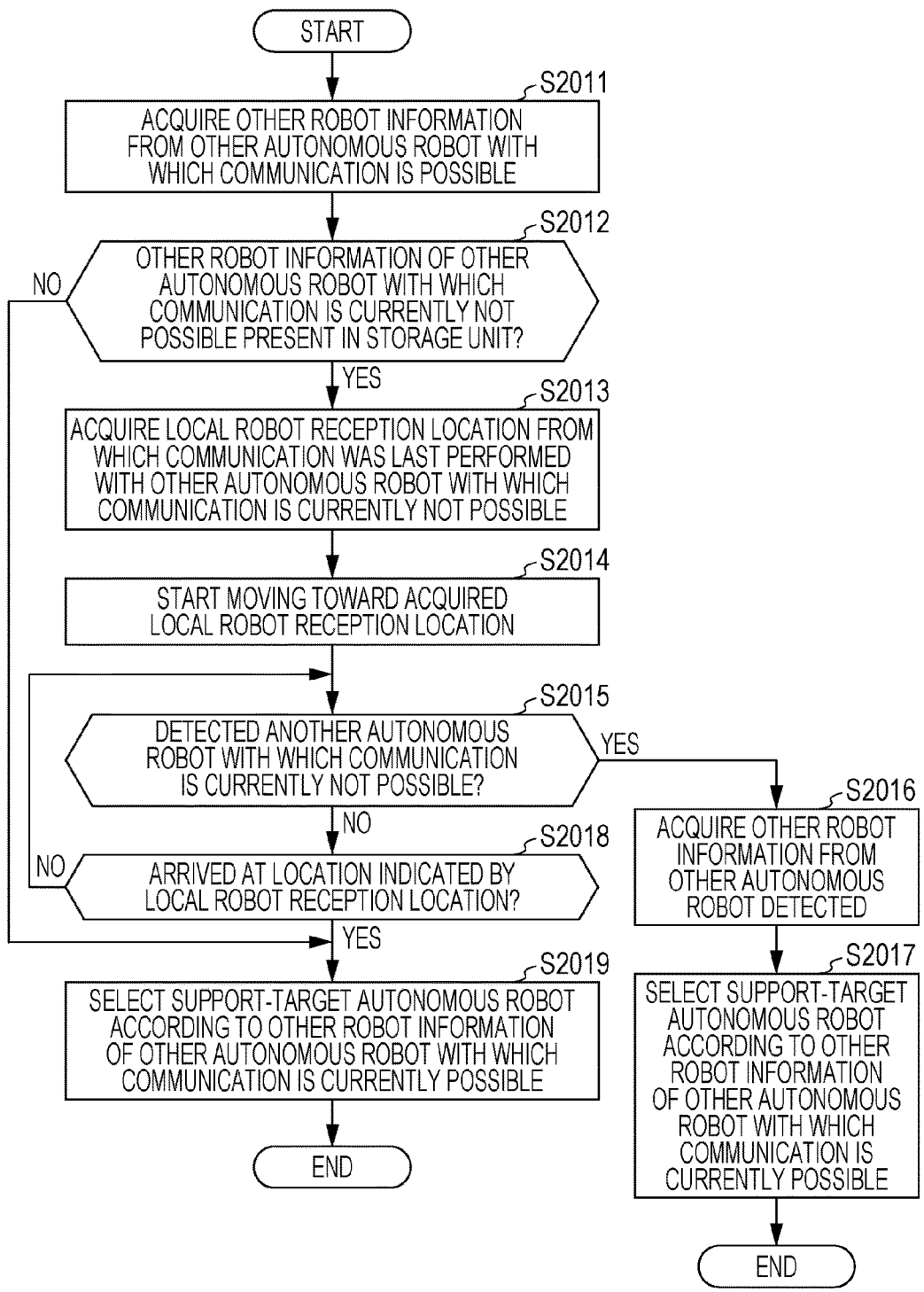
FIG. 15 is a flowchart for describing a detailed example of selection processing of an autonomous robot in embodiment 2.

FIG. 15 is a flowchart for describing a detailed example of the selection processing of an autonomous robot in embodiment 2. FIG. 15 depicts an example of selection processing in which the autonomous robot 11B selects another autonomous robot for a support target when having completed tasks.

First, the autonomous robot 11B, when having completed the tasks assigned thereto, communicates with each of the other autonomous robots with which communication is currently possible, and acquires the other robot information thereof (S2011).

In the present embodiment, the autonomous robot 11B communicates with each of the autonomous robots 13B and 14B, acquires the other robot information 1152B, and stores this in the storage unit 115B. The other robot information 1152B that is acquired is, for example, robot-specific information that includes robot identification information and specification information of the autonomous robots 13B and 14B, task information that is information relating to tasks, a local robot reception location, and the like. It should be noted that, in the case where the autonomous robot 11B communicates with another autonomous robot with which communication is possible and the other robot information of the other autonomous robot is already stored, the other robot information that is stored is updated.

Next, the autonomous robot 11B confirms with the storage unit 115B to determine whether there is other robot information of other autonomous robots with which communication is currently not possible (S2012).

In S2012, in the case where there is no other robot information of other autonomous robots with which communication is currently not possible (no in S2012), an autonomous robot to be a support target is selected on the basis of the other robot information of other autonomous robots with which communication is currently possible (S2019). It should be noted that, in S2019, the same processing as that of S202 to S214 described in FIG. 7 is performed. Since S202 to S214 have been described above, a description thereof is omitted here.

However, in S2012, in the case where there is other robot information of another autonomous robot with which communication is currently not possible (yes in S2012), the local robot reception location from which communication was last performed with the other autonomous robot with which communication is currently not possible is acquired (S2013). In the present embodiment, the autonomous robot 11B extracts the local robot reception location included in (associated with) the other robot information of the other autonomous robot with which communication is currently not possible, in order to attempt to communicate once again with the other autonomous robot with which communication is currently not possible. In the examples depicted in FIGS. 13 and 14B, the autonomous robot 11B extracts the local robot reception location in the other robot information of the autonomous robot 12B with which communication is currently not possible.

The autonomous robot 11B starts moving toward the local robot reception location acquired in S2013 (S2014). In the present embodiment, the autonomous robot 11B starts moving toward the local robot reception location, which is the location from which communication was previously performed with the autonomous robot 12B with which communication is currently not possible, extracted in S2013.

Next, while moving, the autonomous robot 11B determines whether another autonomous robot with which communication is currently not possible has been detected (S2015). In the present embodiment, the autonomous robot 11B, from starting to move until arriving at the local robot reception location acquired in S2013 that is the destination, periodically determines whether the autonomous robot 12B with which communication is currently not possible has been detected.

In the case where another autonomous robot with which communication is currently not possible is detected in S2015 (yes in S2015), the autonomous robot 11B acquires other robot information from the other autonomous robot detected (S2016). In the present embodiment, upon detecting the autonomous robot 12B, the autonomous robot 11B communicates with the detected autonomous robot 12B to acquire the other robot information of the autonomous robot 12B.

The autonomous robot 11B then selects an autonomous robot to be a support target according to the other robot information of the other autonomous robots with which communication is currently possible (S2017). In the present embodiment, the autonomous robot 11B selects an autonomous robot to be a support target, on the basis of the other robot information acquired in S2016, and the other robot information of the autonomous robot 12B with which communication is currently possible, acquired in S2011. It should be noted that, in S2017, the same processing as that of S202 to S214 described in FIG. 7 is performed. Since S202 to S214 have been described above, a description thereof is omitted here.

However, in S2015 and S2018, in the case of having arrived at the location (destination) indicated by the local robot reception location without having detected another autonomous robot with which communication is currently not possible (yes in S2018), the autonomous robot 11B abandons communication with other robots with which communication is currently not possible, and selects an autonomous robot to be a support target, on the basis of the other robot information of the other autonomous robots with which communication is currently possible, acquired in S2011 (S2019).

As described above, the autonomous robot 11B, when having completed the tasks therefor, performs processing to select an autonomous robot to be a support target, on the basis of other robot information of other autonomous robots with which communication is currently possible, and other robot information acquired by once again communicating with other autonomous robots with which communication is currently not possible, from among other robot information stored while executing tasks.

In S2011, in the case where the autonomous robot 11B communicates with another autonomous robot with which communication is possible and the other robot information of the other autonomous robot is already stored, it has been described that the other robot information that is stored is updated; however, it should be noted that the present disclosure is not restricted thereto. The autonomous robot 11B may sequentially accumulate acquired other robot information in the other robot information that is stored. In this case, location information (local robot reception location) from which it has been possible to communicate with another autonomous robot can be sequentially accumulated. Thus, in the case where the autonomous robot 11B attempts communication with another autonomous robot with which communication is currently not possible, using location information (local robot reception location) from when communication was last possible, but said communication is not successful, in addition, it becomes possible for the autonomous robot 11B to once again attempt communication with the other autonomous robot with which communication is currently not possible, using location information (local robot reception location) from when communication was next possible following on from said last time.

Furthermore, in S2013, in the case where there is a plurality of other autonomous robots with which communication is currently not possible, the autonomous robot 11B may extract the local robot location information associated with the other robot information of each of the plurality of other autonomous robots, to generate a route such that it is possible to move to all of the plurality of other autonomous robots in an efficient manner. The autonomous robot 11B is thereby able to shorten the movement time, and is therefore able to speed up the resumption of communication with autonomous robots with which communication is currently not possible.

Furthermore, in S2013, in the case where there is a large number of other autonomous robots with which communication is currently not possible, the autonomous robot 11B may select a portion of other autonomous robots from thereamong and move thereto. In the case where there is a large number of other autonomous robots with which communication is currently not possible, a lot of movement time is required for movement in order to communicate with all of the autonomous robots, and time is taken up for matters other than the original objective of supporting other autonomous robots. In this case, the autonomous robot 11B, for example, may select only the other autonomous robots having a local robot reception location within a prescribed distance from the current location of the autonomous robot 11B. Furthermore, the autonomous robot 11B may select only the other autonomous robots having a local robot reception location to which movement is possible within a prescribed period from the current location of the autonomous robot 11B. Furthermore, other autonomous robots with which the total movement distance or total movement time of the autonomous robot 11B is within a prescribed range may be selected, or other autonomous robots with which the time during which communication with the autonomous robot 11B has been interrupted is within a prescribed period may be selected.

By adopting this kind of configuration, it is not necessary to spend more than the necessary time for the autonomous robot 11B to once again communicate with other robots with which communication is currently not possible in order to acquire information from the other autonomous robots, and it becomes possible to spend a considerable amount of time supporting autonomous robots, which is the original objective.

Furthermore, it is also feasible for the autonomous robot 11B to detect a new autonomous robot that is different from the intended other autonomous robot during movement between S2014 and S2015. In this case, the autonomous robot 11B may acquire other robot information from the detected new autonomous robot, store the other robot information in the storage unit 115B, and perform processing to select a support-target autonomous robot in S2017 or S2019. It is thereby possible for a support-target autonomous robot to be selected using a greater amount of other robot information.

[Effects, Etc.]

As described above, according to the present embodiment, it is possible to acquire not only the other robot information of other autonomous robots with which communication is currently possible, but also other robot information acquired by communication being attempted once again with other autonomous robots with which communication is currently not possible, from among the other robot information of other autonomous robots stored while executing tasks, and to perform processing to select an autonomous robot to be a support target.

It is thereby possible to realize a movement control method and a movement control device with which it is possible for an autonomous robot to cooperate with a greater number of other autonomous robots to execute tasks even in the case where the other autonomous robots with which communication is possible dynamically change.

Specifically, in the present embodiment, in order to once again acquire the information of other autonomous robots with which communication is currently not possible, the autonomous robot 11B moves in such a way that it becomes possible to communicate once again with other autonomous robots with which communication is currently not possible. In other words, the autonomous robot 11B, upon receiving other robot information from another autonomous robot while executing tasks of the autonomous robot 11B, acquires location information for the autonomous robot 11B, and associates and stores the received other robot information and the acquired location information for the autonomous robot 11B (local robot reception location). The autonomous robot is thereby able to leave location information (local robot reception location) from when it had been possible to communicate with the other autonomous robot. In the case where it is desired for communication to once again be performed with another autonomous robot with which communication is currently not possible, the autonomous robot 11B extracts the location information (local robot reception location) from when it had been previously possible to communicate with the other autonomous robot with which communication is currently not possible, and moves toward that location, and by doing so is able to attempt communication once again with the other autonomous robot with which communication had not been possible.

It should be noted that, since the other autonomous robots are also moving, it is also feasible for communication to not be possible even when the autonomous robot 11B has moved to the extracted location information (local robot reception location). That is, in the case where a long time has elapsed from an interruption in communication with another autonomous robot with which communication is currently not possible, there is a possibility of the other autonomous robot with which communication is currently not possible having moved a considerable extent. Therefore, there is a high possibility of the autonomous robot 11B not being able to communicate with the other autonomous robot even when having moved to the extracted location information (local robot reception location).

However, in the case where not much time has elapsed from communication with the other autonomous robot with which communication is currently not possible having been interrupted, it is feasible for the other autonomous robot to have not moved very far, and therefore there is a high possibility of the autonomous robot 11B being able to communicate upon having moved to the extracted location information (local robot reception location).

Consequently, it is thought that the movement control method and the like of the present embodiment are particularly effective in the case where not much time has elapsed from communication between the autonomous robot 11B and another autonomous robot with which communication is currently not possible having been interrupted.

(Modified Example 1)

In the present embodiment, a description has been given in which the autonomous robot 11B requests other autonomous robots for other robot information of the other autonomous robots; however, the present disclosure is not necessarily restricted to this configuration.

For example, each of the other autonomous robots may periodically transmit other robot information thereof, and receive other robot information from each of the other autonomous robots within the communication range of the autonomous robot 11B.

(Modified Example 2)

In the present embodiment, a description has been given in which the autonomous robot 11B periodically communicates with other autonomous robots within a communication range while executing tasks thereof and receives other robot information; however, the present disclosure is not restricted thereto.

For example, the autonomous robot 11B may communicate with another autonomous robot to acquire the other robot information thereof only when having newly detected the other autonomous robot. The autonomous robot 11B may have any kind of configuration as long as it is possible to acquire other robot information from other autonomous robots within the communication range while executing tasks for the coverage region 21 thereof.

(Modified Example 3)

In the present embodiment, when the autonomous robot 11B has acquired other robot information from another autonomous robot when having completed tasks, the location of the autonomous robot 11B at that time has been included; however, said location does not have to be included.

This is because, although it is invariably necessary for the autonomous robot 11B to associate other robot information and location information thereof when having received information from another autonomous robot while executing tasks, it is not necessary for the location thereof (local robot reception location) to be associated with other robot information acquired from another autonomous robot when the tasks have been completed.

(Modified Example 4)

In the present embodiment, a description has been given in which the autonomous robot 11B, upon receiving other robot information from another autonomous robot while executing tasks of the autonomous robot 11B, acquires location information of the autonomous robot 11B, and associates and stores the received information of the other autonomous robot and the acquired location information of the autonomous robot 11B; however, the present disclosure is not restricted thereto.

The configuration is inconsequential as long as the autonomous robot 11B is able to retain and refer to location information from the point in time at which it had been possible to communicate with another autonomous robot.

(Modified Example 5)

In the present embodiment, a description has been given in which the autonomous robot 11B periodically communicates with other autonomous robots within a communication range while executing tasks for the coverage region 21 of the autonomous robot 11B, and acquires and stores information of the other autonomous robots; however, the present disclosure is not restricted thereto.

For example, there are cases where the autonomous robot 11B, when selecting another autonomous robot for a support target after having completed tasks, possesses other robot information received from another autonomous robot that was within the communication range of the autonomous robot 11B immediately before completing the tasks thereof. In these cases, the autonomous robot 11B does not have to newly acquire other robot information from the other autonomous robot after having completed the tasks. The autonomous robot 11B may then deem the other robot information received immediately before completing the tasks as the most up-to-date information, and perform selection processing for a support-target autonomous robot on the basis of that other robot information.

It is thereby possible to limit the autonomous robot 11B acquiring other robot information from the other autonomous robot twice, namely immediately before and immediately after completing the tasks. Since the period between immediately before and immediately after task completion is short, it is thought that there is a low possibility of there being a considerable difference between the information received from the other autonomous robot immediately before the task completion and the other robot information received from the other autonomous robot immediately after the task completion. Consequently, even in this manner, it is thought that it is possible for the autonomous robot 11B to appropriately select a support-target autonomous robot.

(Modified Example 6)

In the present embodiment, a description has been given in which, if other robot information of another autonomous robot with which communication is currently not possible is present in the storage unit 115B, the autonomous robot 11B moves to the local robot reception location associated with that other robot information; however, the present disclosure is not restricted thereto.

In the case where other robot information of another autonomous robot with which communication is currently not possible is present, the autonomous robot 11B may perform determination processing with regard to performing movement if the distance between the current location thereof and the local robot reception location included in the other robot information of the other autonomous robot with which communication is currently not possible is within a prescribed distance. The reason being that, in the case where the local robot reception location associated with the other robot information is far from the current location of the autonomous robot 11B, it takes a long time for the autonomous robot 11B to move, and there is a high possibility that the other autonomous robot with which communication is to be attempted may have moved a considerable extent while the autonomous robot 11B is moving, and that communication may no longer be possible even when the autonomous robot 11B has moved to the local robot reception location.

In this way, according to the present modified example, the autonomous robot 11B is able to move only in the case where there is a high possibility of communicating with the other autonomous robot with which communication is currently not possible, and is therefore able to limit unnecessary movement in the case where there is a low possibility of being able to communicate with the other autonomous robot despite having moved.

(Modified Example 7)

It should be noted that, in the present embodiment, it is also feasible for the autonomous robot 11B to become unable to communicate with the other autonomous robots 13 and 14 with which communication had been currently possible, while moving toward the location (local robot reception location) from which communication was last performed with the autonomous robot 12 with which communication is currently not possible.

In this case, there is a decrease in the other robot information of the autonomous robots 13 and 14 with which communication had been currently possible that is to be used when the autonomous robot 11B selects a support-target autonomous robot. That is, the autonomous robot 11B becomes unable to use the other robot information of the autonomous robots 13 and 14 with which communication has become not possible while moving, despite becoming able to communicate with the autonomous robot 12 with which communication had been currently not possible, and it is therefore also feasible that the autonomous robot 11B may not be able to appropriately select a support-target autonomous robot.

Therefore, the autonomous robot 11B may, at the point in time at which the autonomous robot 11B completes its tasks, use only the other robot information of the other autonomous robots 13 and 14 with which communication is currently possible, to temporarily determine a support-target autonomous robot. The autonomous robot 11B may then start moving in order to communicate with the autonomous robot 12 with which communication is currently not possible, and, when it has become possible to communicate with the autonomous robot 12, acquire other robot information from the autonomous robot 12 with which communication has become possible.

In this case, the autonomous robot 11B may perform the alteration processing described in embodiment 1, at the point in time when having acquired the other robot information from the autonomous robot 12.

According to this configuration, it becomes possible for the autonomous robot 11B to select a support-target autonomous robot on the basis of the other robot information of the autonomous robots 13 and 14 with which communication had been possible at the point in time at which the autonomous robot 11B completed its tasks, and the other robot information obtained by communicating once again with the autonomous robot 12 with which communication had not been possible.

(Embodiment 3)

In the present embodiment, a description is given regarding a different example from embodiment 2 regarding the case where an autonomous robot 110, while executing and when having completed tasks thereof, selects a support-target autonomous robot from among other autonomous robots with which communication had been possible.

In embodiment 2, a description was given regarding an example of the case where the autonomous robot 11B selects a support-target robot on the basis of other robot information of other autonomous robots with which communication is currently possible when having completed tasks for the coverage region thereof, and other robot information acquired by attempting communication once again with another autonomous robot with which communication is currently not possible.

In the present embodiment, a description is given regarding an example of the case where the autonomous robot 110 selects a support-target robot on the basis of the task information of another autonomous robot with which communication is currently possible when having completed tasks for the coverage region thereof, and estimated task progress information obtained by estimating the current task progress information of another autonomous robot with which communication is currently not possible.

[Functional Configuration of Autonomous Robot]

Hereinafter, as with embodiments 1 and 2, the functional configuration of the autonomous robot 11C will be representatively described.

Figure 16:
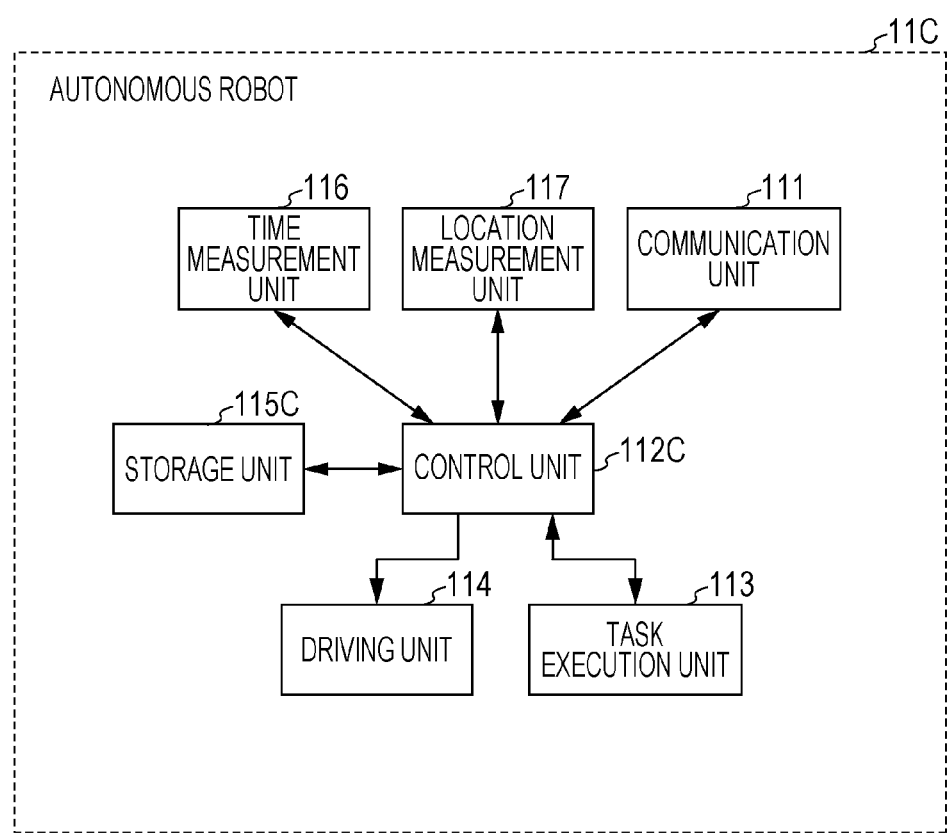
FIG. 16 is a block diagram depicting an example of the functional configuration of an autonomous robot in embodiment 3.

FIG. 16 is a block diagram depicting an example of the functional configuration of an autonomous robot in embodiment 3. The same elements as in FIGS. 2 and 10 are denoted by the same reference numbers, and a detailed description thereof is omitted.

The autonomous robot 11C depicted in FIG. 16 is different from the autonomous robot 11 depicted in FIG. 2 with regard to the configurations of a control unit 112C and a storage unit 115C.

[Control Unit 112C]

Figure 17:
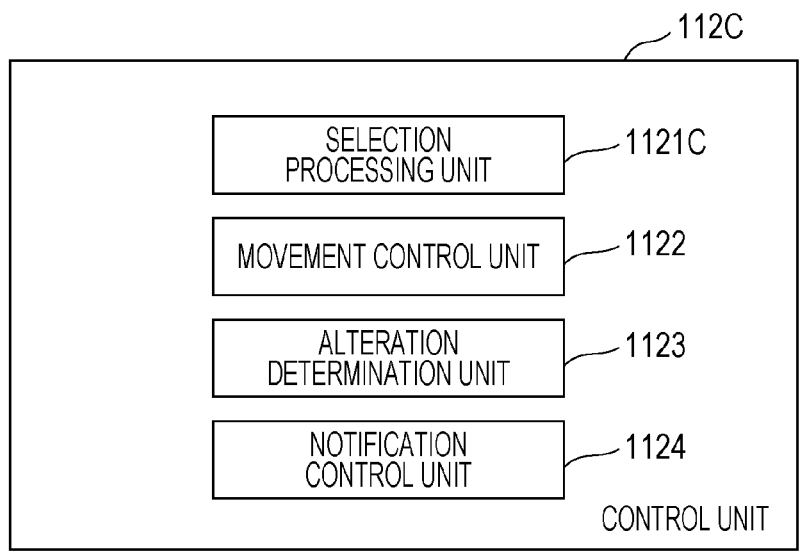
FIG. 17 is a block diagram depicting an example of the detailed configuration of a control unit depicted in FIG. 16.

FIG. 17 is a block diagram depicting an example of the detailed configuration of the control unit depicted in FIG. 16. The same elements as in FIG. 3 are denoted by the same reference numbers, and a detailed description thereof is omitted.

As depicted in FIG. 17, the control unit 112C is provided with a selection processing unit 1121C, a movement control unit 1122, an alteration determination unit 1123, and a notification control unit 1124. The control unit 112C is different from the control unit 112 depicted in FIG. 3 with regard to the configuration of the selection processing unit 1121C.

The selection processing unit 1121C is provided with the functions of the selection processing unit 1121. The selection processing unit 1121C, in addition, selects a support-target robot from within a robot group, which is a plurality of robots other than the autonomous robot 11C (first robot) with which communication is currently possible and has been possible in the past with the autonomous robot 11C (first robot).

In the present embodiment, the selection processing unit 1121C uses at least one item of other robot information of a plurality of autonomous robots with which communication has been possible in the past with the autonomous robot 11C (first robot), and the current location of the autonomous robot 11C (first robot), to estimate the remaining tasks for a point in time at which the autonomous robot 11C (first robot) will have moved to the at least one other autonomous robot. In this way, the selection processing unit 1121C acquires the remaining tasks of each robot of a robot group that includes the at least one autonomous robot. Here, the aforementioned other robot information is stored in the storage unit 115C.

It should be noted that, in order to estimate the current tasks and remaining tasks of the information of another autonomous robot with which communication is currently not possible, it is sufficient to have the other robot information last received from the other autonomous robot with which communication is currently not possible and the reception time at which that information was last received. The reason being that, with these items of information, it is possible to use the other robot information last received from the other autonomous robot with which communication is currently not possible, to estimate the amount of tasks executed by the other autonomous robot with which communication is currently not possible in the time that has elapsed from the reception time at which the other robot information was last received to the current time. In this way, the autonomous robot 110 is able to estimate the current task progress of the other autonomous robot with which communication is currently not possible.

[Storage Unit 1150]

Figure 18:
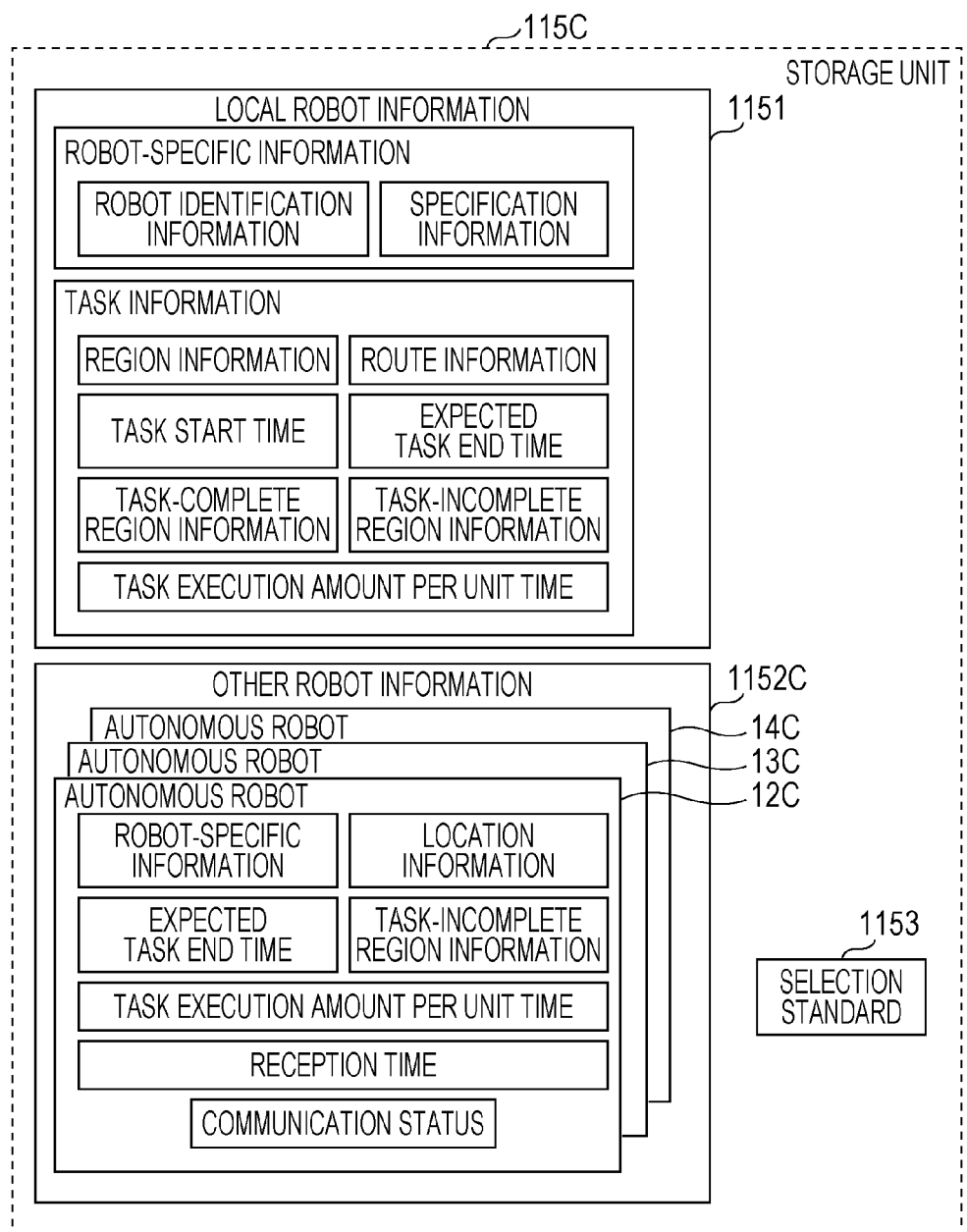
FIG. 18 is a drawing conceptually depicting information stored in a storage unit of an autonomous robot in embodiment 3.

Next, FIG. 18 will be used to describe the information stored in the storage unit 115C of the autonomous robot 110.

FIG. 18 is a drawing conceptually depicting the information stored in the storage unit of an autonomous robot in embodiment 3. The same elements as in FIG. 4 are denoted by the same reference numbers, and a detailed description thereof is omitted.

As in embodiment 1, the storage unit 115C stores local robot information 1151, a selection standard 1153, and other robot information 1152C that is based on information transmitted from other autonomous robots.

The storage unit 115C is different from the storage unit 115 depicted in FIG. 4 in that the information included in the other robot information 1152C is different, and that other robot information of other autonomous robots received while the autonomous robot 110 (first robot) is executing tasks with respect to the coverage region 21 (first coverage region) is stored. In the present embodiment, the autonomous robot 110, while executing tasks for the coverage region 21 thereof, periodically communicates with other autonomous robots within a communication range, and stores acquired other robot information of the other autonomous robots.

(Details of the Other Robot Information)

As depicted in FIG. 18, the other robot information 1152C includes information indicating a reception time and a communication status in addition to the information included in the other robot information 1152 depicted in FIG. 4. The communication status is information indicating the current communication status of each of the other autonomous robots. The reception time is information indicating the time at which the autonomous robot 110 has received other robot information from another autonomous robot, and is acquired by the time measurement unit 116. The reception time is associated with other robot information and stored, such as being included in other robot information.

FIG. 19 is a drawing depicting an example of the other robot information depicted in FIG. 18. The same elements as in FIG. 5 are denoted by the same reference numbers, and a detailed description thereof is omitted.

FIG. 19 depicts that the information of autonomous robots 12C, 13C, and 14C is stored as the other robot information 1152C in the storage unit 115C. Furthermore, FIG. 19 depicts that, at present, the autonomous robot 110 is able to communicate with the autonomous robots 13C and 14C but is unable to communicate with the autonomous robot 12C. Here, the other robot information of the autonomous robot 12C depicted in FIG. 19 was received when the autonomous robot 110 was previously able to communicate with the autonomous robot 12C.

The autonomous robot 110 configured as described above selects another autonomous robot to be a support target with consideration being given not only to the other robot information of autonomous robots with which communication is currently possible, but also to the current task progress estimated on the basis of the other robot information of another autonomous robot with which communication is currently not possible, from among the other robot information of other autonomous robots stored while executing tasks.

[Operation of Autonomous Robot]

Next, an overview of the operation of the autonomous robot 110 configured as described above will be described.

Figure 20A:
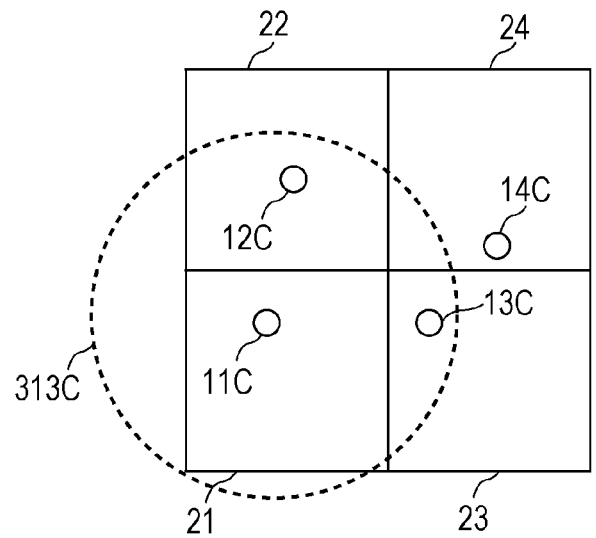
FIG. 20A is a drawing conceptually depicting a situation for autonomous robots that make up a robot system in embodiment 3.
Figure 20B:
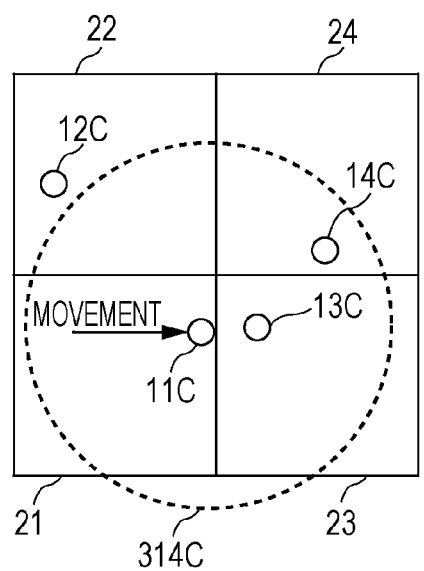
FIG. 20B is a drawing conceptually depicting a situation for autonomous robots that make up a robot system in embodiment 3.

FIGS. 20A and 20B are drawings conceptually depicting a situation for autonomous robots that make up the robot system in embodiment 3. FIG. 20A depicts an example of a situation in which the autonomous robots 110 to 14C are executing tasks for coverage regions thereof. FIG. 20B depicts an example of the situation when the autonomous robot 110 has completed its tasks. The same constituent elements as in FIG. 1 are denoted by the same reference numbers, and a description thereof is omitted.

A communication range 313C of FIG. 20A and a communication range 314C of FIG. 20B indicate communication ranges in which the autonomous robot 110 is able to communicate. As depicted in FIG. 20A, the autonomous robot 110 while executing tasks is able to communicate with the other autonomous robots 12C and 13C that are within the communication range 313C. However, as depicted in FIG. 20B, the autonomous robot 110 when having completed the tasks is able to communicate with the autonomous robots 13C and 14C that are within the communication range 314C but is not able to communicate with the autonomous robot 12C with which communication had been possible in FIG. 20A.

Therefore, the autonomous robot 110 depicted in FIG. 20B, upon completing the tasks for the coverage region 21 assigned thereto, selects an autonomous robot to be a support target on the basis of the other robot information of the autonomous robots 13C and 14C with which communication is currently possible, and the other robot information of the autonomous robot 12C that is another autonomous robot with which communication is currently not possible, from among the information of other autonomous robots stored while executing the tasks.

(Details of the Selection Processing)

Next, the details of the selection processing in the present embodiment will be described using FIG. 21.

Figure 21:
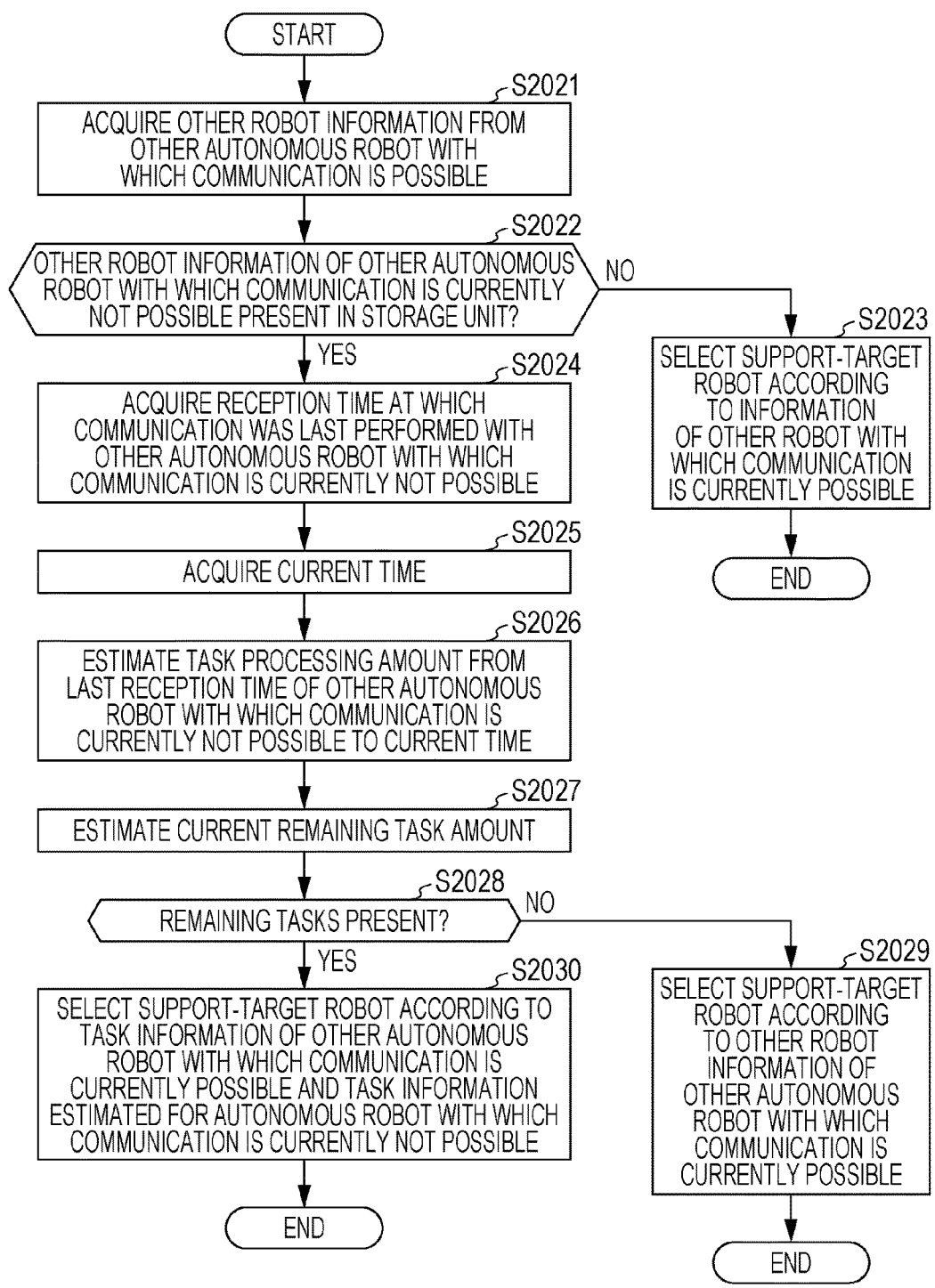
FIG. 21 is a flowchart for describing a detailed example of selection processing of an autonomous robot in embodiment 3.

FIG. 21 is a flowchart for describing a detailed example of the selection processing of an autonomous robot in embodiment 3. FIG. 21 depicts an example of selection processing in which the autonomous robot 110, when having completed its tasks, selects another autonomous robot for a support target.

First, the autonomous robot 110, when having completed the tasks assigned thereto, communicates with each of the other autonomous robots with which communication is currently possible, and acquires the other robot information thereof (S2021).

In the present embodiment, the autonomous robot 110 communicates with the autonomous robots 13C and 14C, acquires the other robot information 1152C, and stores this in the storage unit 115C. The other robot information 1152C acquired by the autonomous robot 110 is, for example, robot-specific information that includes identification information and specification information of the autonomous robots 13C and 14C, task information that is information relating to tasks, a reception time, and the like. It should be noted that the autonomous robot 110, when having completed its tasks, does not have to acquire the reception time as the other robot information 1152C. This is because it is sufficient as long as the association between the reception time and the robot-specific information or task information received from another autonomous robot is implemented while tasks are being executed, and therefore the reception time from when the tasks have been completed is not absolutely necessary.

Next, the autonomous robot 110 confirms with the storage unit 115C to determine whether there is other robot information of other autonomous robots with which communication is currently not possible in the storage unit 115C (S2022).

In S2022, in the case where there is no other robot information of other autonomous robots with which communication is currently not possible in the storage unit 115C (no in S2022), a support-target robot is selected on the basis of the other robot information of the other autonomous robots with which communication is currently possible (S2023). It should be noted that, in S2022, the same processing as that of S202 to S214 described in FIG. 7 is performed. Since S202 to S214 have been described above, a description thereof is omitted here.

However, in S2022, in the case where there is other robot information of another autonomous robot with which communication is currently not possible in the storage unit 115C (yes in S2022), the reception time at which communication was last performed with the other autonomous robot with which communication is currently not possible is acquired (S2024). In the present embodiment, the autonomous robot 110 extracts the reception time included in the other robot information of the autonomous robot 12C with which communication is currently not possible, from the storage unit 115C.

Next, the autonomous robot 110 acquires the current time (S2025). In the present embodiment, the autonomous robot 110 acquires current time information from the time measurement unit 116.

Next, the autonomous robot 110 performs processing to estimate the current task progress information of the other autonomous robot with which communication is currently not possible in S2026 to S2027.

In S2026, the task processing amount from the last reception time of the other autonomous robot with which communication is currently not possible to the current time is estimated (S2026). In the present embodiment, first, the autonomous robot 110 uses the reception time extracted in S2024 and the current time information acquired in S2025 to calculate the time from said reception time to the current time. Next, the autonomous robot 110 extracts information on the task processing amount per unit time of the autonomous robot 12C with which communication is currently not possible, from the other robot information 1152C in the storage unit 115C. The autonomous robot 110 then multiplies the extracted task processing amount per unit time and the aforementioned calculated time to thereby estimate the task processing amount in the aforementioned time of the autonomous robot 12C with which communication is currently not possible.

Then, in S2027, the autonomous robot 110 estimates the current amount of remaining tasks of the other autonomous robot with which communication is currently not possible. It should be noted that, in the case where there is a plurality of other robot information of other autonomous robots with which communication is currently not possible, the current amount of remaining tasks is estimated for each of the other autonomous robots. In the present embodiment, first, the autonomous robot 110 extracts task-incomplete region information from the other robot information of the autonomous robot 12C with which communication is currently not possible. Next, the autonomous robot 110 uses the extracted task-incomplete region information and the task processing amount in the aforementioned time estimated in S2026 to estimate the current amount of remaining tasks.

Next, the autonomous robot 110 determines whether there are remaining tasks for the other autonomous robot with which communication is currently not possible (S2028). In the present embodiment, the autonomous robot 110 determines whether there are remaining tasks for the autonomous robot 12C with which communication is currently not possible, from the current amount of remaining tasks of the autonomous robot 12C, estimated in S2027.

In S2028, in the case where there are no remaining tasks (no in S2028), an autonomous robot to be a support target is selected on the basis of the other robot information of the other autonomous robots with which communication is currently possible, acquired in S2021 (S2029). In the present embodiment, in the case where the current amount of remaining tasks estimated in S2027 is less than 0, the autonomous robot 110 deems that the autonomous robot 12C with which communication is currently not possible has completed the tasks for the coverage region, and processing advances to S2029. It should be noted that, in S2029, the same processing as that of S202 to S214 described in FIG. 7 is performed. Since S202 to S214 have been described above, a description thereof is omitted here.

However, in S2028, in the case where there are remaining tasks (yes in S2028), a support-target autonomous robot is selected according to the task information of the other autonomous robots with which communication is currently possible and the task information estimated for the other autonomous robot with which communication is currently not possible (S2030). In the present embodiment, in the case where the current amount of remaining tasks estimated S2027 is greater than 0, the autonomous robot 110 deems that there is a task-incomplete region remaining for the autonomous robot 12C with which communication is currently not possible, and uses task-related information such as the task-incomplete region information of the autonomous robots 13C and 14C with which communication is currently possible, and the current amount of remaining tasks estimated for the autonomous robot 12C with which communication is currently not possible, to select a support-target autonomous robot. It should be noted that, in S2030, the same processing as that of S202 to S214 described in FIG. 7 is performed. Since S202 to S214 have been described above, a description thereof is omitted here.

As described above, after having completed the tasks for the coverage region thereof, the autonomous robot 110 selects an autonomous robot to be a support target, on the basis of the other robot information of other autonomous robots with which communication is currently possible, and estimated task progress information for other autonomous robots with which communication is currently not possible. As described above, this estimated task progress information is the current task progress information of another autonomous robot with which communication is currently not possible, estimated using the other robot information of the other autonomous robot with which communication is currently not possible that has been stored while the autonomous robot 110 has been executing tasks.

[Effects, Etc.]

As described above, according to the present embodiment, in order to estimate the task progress of another autonomous robot when communication is not possible, the autonomous robot 110, when having received information from the other autonomous robot while executing its own tasks, stores other robot information that includes time information relating to said reception. Specifically, the autonomous robot 110, upon receiving other robot information from the other autonomous robot while executing its own tasks, stores the other robot information with a reception time indicating a time acquired by the time measurement unit 116 being included therein.

The autonomous robot 110 is thereby able to select an autonomous robot to be a support target with consideration being given not only to the other robot information of other autonomous robots with which communication is currently possible, but also to estimated task progress information for another autonomous robot with which communication is currently not possible, estimated using the other robot information of the other autonomous robot stored while executing tasks.

The autonomous robot 110 is thereby able to use a greater amount of other robot information to select an autonomous robot to be a support target, and is therefore able to select a more appropriate autonomous robot to be a support target.

(Modified Example 1)

In the present embodiment, a description has been given in which the autonomous robot 110 estimates task progress information for another autonomous robot with which communication is not possible; however, the present disclosure is not restricted thereto. For example, the autonomous robot 110 may estimate the location information of another autonomous robot with which communication is not possible. Regarding a method for estimating location information, for example, the autonomous robot 110 may, when acquiring other robot information from another autonomous robot, also acquire and store route information relating to the execution of tasks for the coverage region of the other autonomous robot. The autonomous robot 110, when having completed its own tasks, is thereby able to estimate the location of the other autonomous robot with which communication is not possible, on the basis of the acquired route information. For example, the autonomous robot 110 is able to calculate the distance from the reception time at which information was last acquired from the other autonomous robot with which communication is not possible, to the present time, on the basis of a movement speed indicated in the specification information of the other autonomous robot. The autonomous robot 110 is then able to estimate the current location of the other autonomous robot as being a location to which movement has been made by the calculated distance, on the basis of the route information, from the location information of the other autonomous robot from when information was last acquired from the other autonomous robot.

In this way, according to the present modified example, the autonomous robot 110 is able to estimate location information and task progress information of another autonomous robot with which communication is not possible, and is therefore able to more appropriately select an autonomous robot to be a support target.

(Modified Example 2)

In the present embodiment, a description has been given in which the autonomous robot 110 estimates the current task progress of another autonomous robot with which communication is currently not possible. However, the accuracy of this estimated task progress changes depending on the time from the last reception time with the autonomous robot with which communication is currently not possible to the current time.

That is, if there is a short length of time from the last reception time with the other autonomous robot with which the autonomous robot 110 currently cannot communicate to the current time, it is thought that the estimated task progress is accurate with there being no considerable difference with the actual task progress. On the other hand, if there is a long length of time from the last reception time with the other autonomous robot with which the autonomous robot 110 currently cannot communicate to the current time, it is thought that the estimated task progress is low in accuracy with there possibly being a considerable difference with the actual task progress. Therefore, when using a task progress estimated when the aforementioned time is long, to perform selection processing for a support-target autonomous robot, it is feasible that the autonomous robot 110 may select an autonomous robot that is inappropriate as a support target.

Therefore, the autonomous robot 110 may estimate the task progress for another autonomous robot with which communication is currently not possible, when the aforementioned time is short and it is possible to estimate that the accuracy of the estimated task progress will be high. Specifically, the autonomous robot 110 may estimate the current task progress for another autonomous robot with which communication is currently not possible, only in the case where the aforementioned time is within a prescribed period.

Thus, this method can be used by the autonomous robot 110 only when there is a high possibility of the estimated task progress being accurate, and it therefore becomes possible to suppress the development of a situation in which the support-target autonomous robot selected by the autonomous robot 110 is actually inappropriate as a support target.

(Modified Example 3)

It should be noted that there is no restriction to the case of the aforementioned modified example 2, and the autonomous robot 110 may, with regard to the time from the reception time at which reception was last performed with another autonomous robot with which communication is not possible to the current time, assign priority levels such that the priority level increases as the time becomes shorter, and select support-target autonomous robots in order from other autonomous robots that have reception times of a high priority time.

Modified example 2 is used only when there is a high possibility of the estimated task progress being accurate. However, in the present modified example, even in the case where the possibility of the estimated task progress being accurate is not high, this method can be used as long as support-target autonomous robots are in descending order of priority level.

That is, in the case where the autonomous robot 110 has not been able to select another autonomous robot to be a support target with the method of modified example 2, there is risk of an idle state being entered. However, the method of the present modified example can be used by the autonomous robot 110 even in the case where the possibility of the estimated task progress being accurate is not high, and it is therefore possible to reduce the possibility of entering an idle state.

(Modified Example 4)

Furthermore in the present embodiment, a description has been given in which, after having completed the tasks for the coverage region thereof, the autonomous robot 110 selects an autonomous robot to be a support target on the basis of the other robot information of other autonomous robots with which communication is currently possible, and estimated task progress information for other autonomous robots with which communication is currently not possible; however, the present disclosure is not restricted thereto. This method may be used in combination with the method described in embodiment 2. In this case, the autonomous robot 110 may, while executing tasks thereof, additionally include and store location information thereof in other robot information received from another autonomous robot.

It should be noted that numerous methods are feasible according to system specifications regarding determining the situations in which to use processing for once again acquiring other robot information of another autonomous robot with which communication with the autonomous robot 110 is currently not possible, and processing for estimating the current task progress.

For example, the autonomous robot 110 may determine whether the time from the task completion time thereof to the last reception time with an autonomous robot with which communication is currently not possible is within a prescribed period. If within the prescribed period, the autonomous robot 110 may move to the location (place) where it was last possible to communicate with the autonomous robot with which communication is currently not possible in order to communicate with said autonomous robot with which communication is currently not possible, and if outside of the prescribed period, the autonomous robot 110 may estimate the current task status of the autonomous robot with which communication is currently not possible.

The reason being that, in the case where a considerable length of time has elapsed from the interruption in communication between the autonomous robot 110 and the other autonomous robot with which communication is currently not possible, it is thought that the other autonomous robot with which communication is currently not possible will have moved a considerable extent during that elapsed time. That is, in the case where the elapsed time is considerable, it is thought that there is a high possibility of not being able to communicate with the other robot even if the autonomous robot 110 moves to attempt communication.

In this way, the autonomous robot 110 is not only able to limit movement in the case where the elapsed time is considerable but is also able to, instead of simply not moving, use the estimated current task progress of the other autonomous robot with which communication is currently not possible, in the processing to select an autonomous robot to be a support target.

In the present modified example, a determination is made as to whether the aforementioned time is within a prescribed period; however, it should be noted that the present disclosure is not restricted thereto. The autonomous robot 110 may determine whether the distance from the location thereof when having completed its tasks to the location from which communication had last been possible with the other autonomous robot with which communication is currently not possible is within a prescribed distance. The same effect can be obtained also in this case.

Furthermore, in the present modified example, the autonomous robot 110, when having completed its own tasks, may estimate the current task progress of another autonomous robot with which communication is currently not possible, and only move to another autonomous robot estimated to still have remaining tasks on the basis of the estimated task progress. This is because it is thought that other autonomous robots that have completed their tasks will be moving to provide support to other autonomous robots.

It is thereby possible for the autonomous robot 110 to limit movement to other autonomous robots estimated to have already completed their tasks.

Furthermore, in the present modified example, the autonomous robot 110, when having completed its own tasks, may move to communicate with another autonomous robot with which communication is currently not possible, in a range within which it is possible to maintain communication with all of the other autonomous robots with which communication is currently possible. In this case, when it is no longer possible to maintain communication with all of the other autonomous robots with which communication is currently possible, the autonomous robot 110 may discontinue movement to the other autonomous robot with which communication is currently not possible, and estimate the current tasks.

The autonomous robot 110 is thereby able to reliably use the other robot information of all of the other autonomous robots with which communication is currently possible, and it is therefore possible to prevent a decrease in the information of the autonomous robots with which communication is currently possible.

(Embodiment 4)

In embodiment 4, a description is given regarding an example of the case where an autonomous robot 11D, when having completed its own tasks, has not been able to select an autonomous robot to be a support target, from among other autonomous robots with which communication is possible. Hereinafter, a description will be given regarding an example of the case where the autonomous robot 11D, after having completed its tasks, moves autonomously to newly acquire other robot information of other autonomous robots, and selects an autonomous robot to be a support target.

[Functional Configuration of Autonomous Robot]

Hereinafter, as with embodiments 1 to 3, the functional configuration of the autonomous robot 11D will be representatively described.

Figure 22:
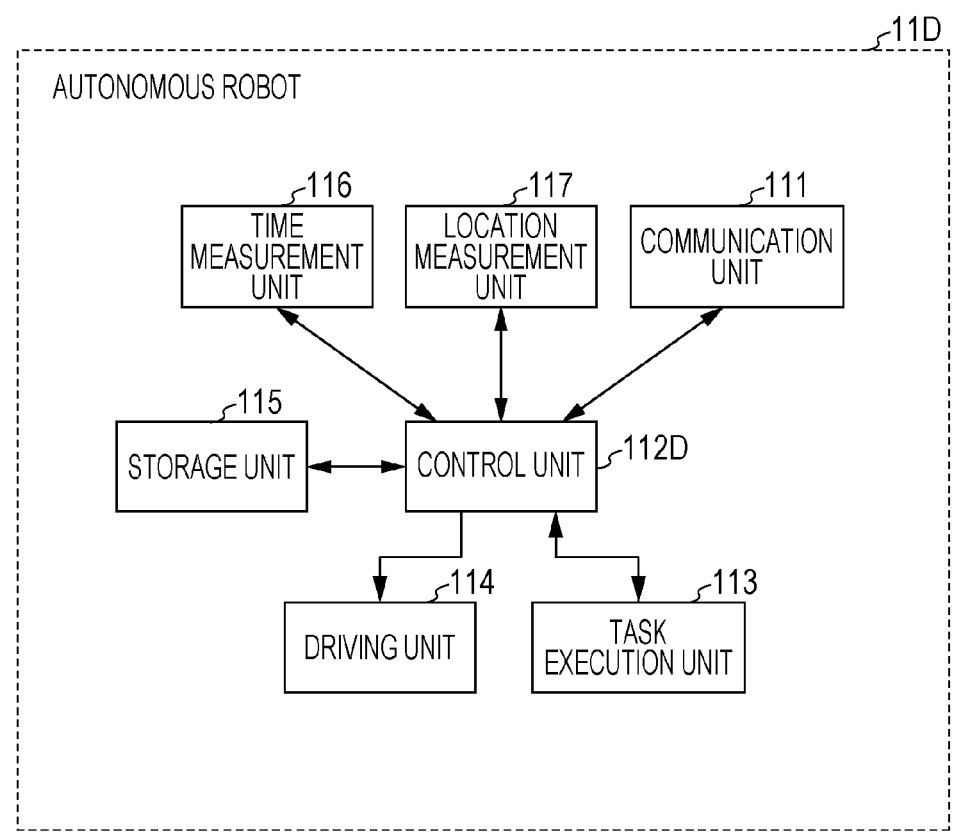
FIG. 22 is a block diagram depicting an example of the functional configuration of an autonomous robot in embodiment 4.

FIG. 22 is a block diagram depicting an example of the functional configuration of an autonomous robot in embodiment 4. The same elements as in FIG. 2 are denoted by the same reference numbers, and a detailed description thereof is omitted.

The autonomous robot 11D depicted in FIG. 22 is different from the autonomous robot 11 depicted in FIG. 2 with regard to the configuration of a control unit 112D.

[Control Unit 112D]

Figure 23:
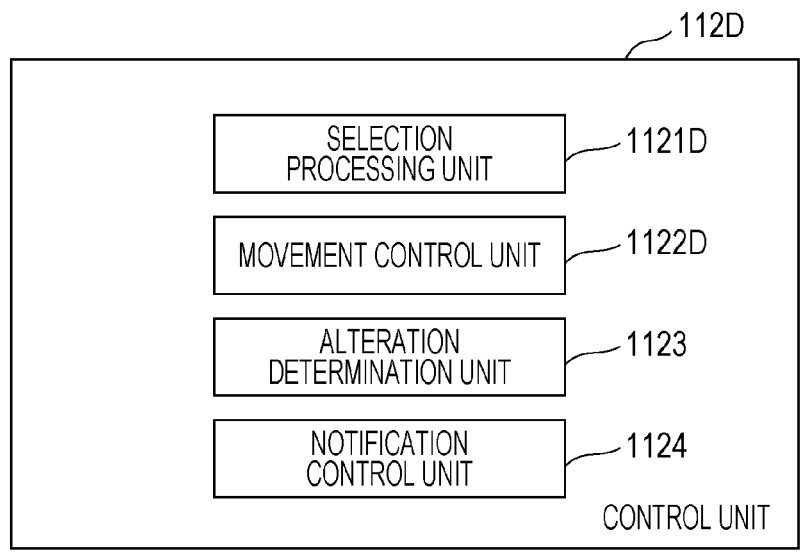
FIG. 23 is a block diagram depicting an example of the detailed configuration of a control unit depicted in FIG. 22.

FIG. 23 is a block diagram depicting an example of the detailed configuration of the control unit depicted in FIG. 22. The same elements as in FIG. 3 are denoted by the same reference numbers, and a detailed description thereof is omitted.

As depicted in FIG. 23, the control unit 112D is provided with a selection processing unit 1121D, a movement control unit 1122D, an alteration determination unit 1123, and a notification control unit 1124. The control unit 112D is different from the control unit 112 depicted in FIG. 3 with regard to the configurations of the selection processing unit 1121D and the movement control unit 1122D.

The selection processing unit 1121D is provided with the functions of the selection processing unit 1121. The selection processing unit 1121D instructs the movement control unit 1122D for the autonomous robot 11D (first robot) to be made to move outside of the coverage region 21 (outside of the first coverage region) in the case where tasks for the coverage region 21 (first coverage region) have been completed and when the autonomous robot 11D (first robot), which is within the coverage region 21 (first coverage region), is not able to select a support-target robot from within a robot group, such as in the case where there are no acquired remaining tasks for other autonomous robots and in the case where there are no other autonomous robots with which communication is possible when the autonomous robot 11D has completed its tasks.

Furthermore, when it has become possible, while the autonomous robot 11D (first robot) is moving, for the autonomous robot 11D to communicate with another autonomous robot not included in a robot group with which communication had been possible when the autonomous robot 11D completed its tasks, from among a plurality of other autonomous robots making up the robot system, the selection processing unit 1121D receives other robot information that includes location information indicating a current location and task information indicating a task progress status from the other autonomous robot not included in the robot group.

Furthermore, the selection processing unit 1121D uses the current location of the autonomous robot 11D (first robot) and the received other robot information of the other autonomous robot not included in the robot group, to acquire the remaining tasks for a point in time at which the autonomous robot 11D (first robot) will have moved to the current location of the other autonomous robot not included in the robot group. Furthermore, the selection processing unit 1121D selects the robot not included in the robot group, as a support-target robot on the basis of the acquired remaining tasks.

The movement control unit 1122D is provided with the functions of the movement control unit 1122. The movement control unit 1122D, in addition, causes the autonomous robot 11D (first robot) to move outside of the coverage region 21 (first coverage region) in accordance with an instruction from the selection processing unit 1121D.

[Operation of Autonomous Robot]

Next, an overview of the operation of the autonomous robot 11D configured as described above will be described.

Figure 24A:
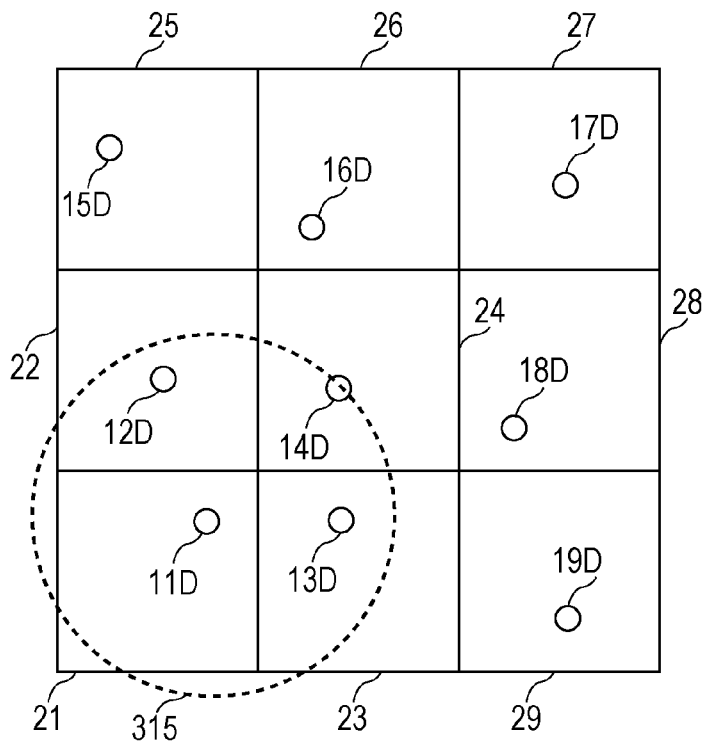
FIG. 24A is a drawing conceptually depicting a situation for autonomous robots that make up a robot system in embodiment 4.
Figure 24B:
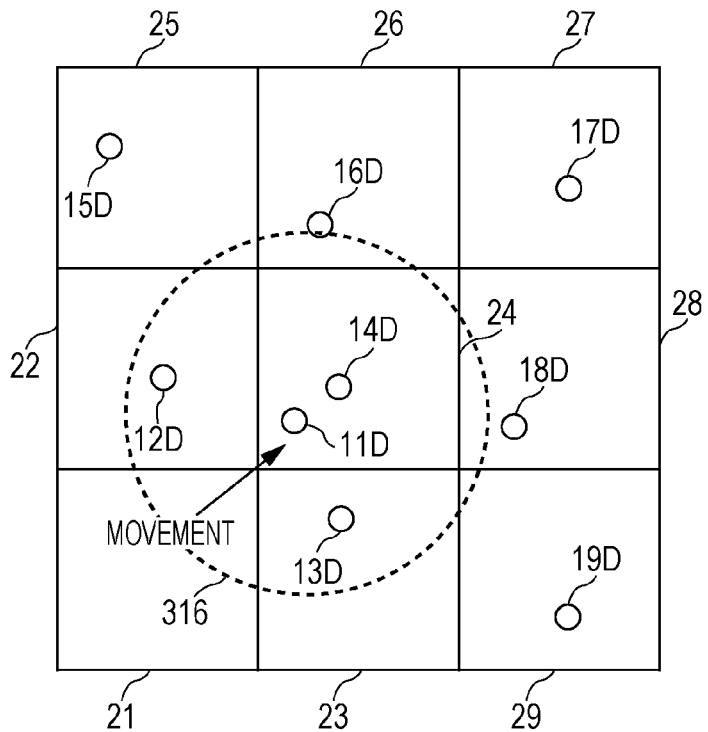
FIG. 24B is a drawing conceptually depicting a situation for autonomous robots that make up a robot system in embodiment 4.

FIGS. 24A and 24B are drawings conceptually depicting a situation for autonomous robots that make up the robot system in embodiment 4. The same constituent elements as in FIG. 1 are denoted by the same reference numbers, and a description thereof is omitted.

FIG. 24A depicts an example of a situation for when the autonomous robot 11D has completed tasks for the coverage region 21 thereof. A communication range 315 indicates the communication range in which the autonomous robot 11D is able to communicate, and the autonomous robot 11D depicted in FIG. 24A is able to communicate with autonomous robots 12D, 13D, and 14D that are within the communication range 315. FIG. 24B conceptually depicts an example of a situation in which the autonomous robot 11D has moved outside of the coverage region 21 thereof and newly detected another autonomous robot. The autonomous robot 11D depicted in FIG. 24B is able to communicate with the autonomous robots 12D, 13D, 14D, and 16D that are within a communication range 316.

In the present embodiment, the autonomous robot 11D depicted in FIG. 24A communicates with the autonomous robots 12D, 13D, and 14D that are within the communication range 315, and uses received other robot information that includes robot-specific information, task information, location information, and the like, to perform selection processing to select an autonomous robot to be a support target. This selection processing is as described in embodiment 1, and a description thereof is therefore omitted here.

The autonomous robot 11D depicted in FIG. 24A then, as a result of having performed the selection processing, deems that it is not necessary to provide support to any of the autonomous robots 12D, 13D, or 14D, and is not able to select an autonomous robot to be a support target.

However, this is merely the result of having carried out selection processing for an autonomous robot to be a support target, using the other robot information of other autonomous robots that are within a communication region, at the location at which the autonomous robot 11D depicted in FIG. 24A completed its tasks. That is, there is also a possibility that the autonomous robot 11D, by moving to a location that is different from the aforementioned location and performing selection processing, will be able to select an appropriate autonomous robot as a support target.

Therefore, the autonomous robot 11D depicted in FIG. 24A moves outside of the coverage region 21 thereof to obtain information of another autonomous robot. The autonomous robot 11D depicted in FIG. 24B then detects another autonomous robot 16 and, upon acquiring the other robot information of the other autonomous robot 16, once again performs selection processing. This selection processing is as described in embodiment 1, and a description thereof is therefore omitted here.

In this way, the autonomous robot 11D is able to select a support-target autonomous robot by using not only the other robot information of other autonomous robots that are present within the communication range from the location where the autonomous robot 11D completed its tasks, but also the other robot information of another autonomous robot newly acquired at a place that is different from the aforementioned location.

It should be noted that the case where it is not possible to select an autonomous robot to be a support target is not restricted to the aforementioned example case. In other words, feasible situations also include: 1) the case where it is has not been possible to communicate with any of the other autonomous robots, and it has therefore not been possible to acquire all of the information of the other autonomous robots and the selection processing itself has not been possible; 2) the case where it has been possible to acquire the other robot information of other autonomous robots and the selection processing has been performed, but the tasks of the other autonomous robots of the acquired other robot information have already been completed and support is not necessary; and 3) the case where it has been possible to acquire the other robot information of other autonomous robots and the selection processing has been performed, but it has been determined that, while the autonomous robot 11D has been moving toward another autonomous robot to be a support-target candidate, the tasks of that other autonomous robot have been completed.

[Effects, Etc.]

As described above, according to the present embodiment, it is possible to realize a movement control method and a movement control device with which it is possible for an autonomous robot to cooperate with a greater number of other autonomous robots to execute tasks even in the case where the other autonomous robots with which communication is possible dynamically change.

More specifically, there are cases where the autonomous robot 11D, after having completed its tasks, has performed selection processing for an autonomous robot to be a support target but is not able to select an autonomous robot to be a support target. In these cases, the autonomous robot 11D autonomously moves to newly acquire other robot information of other autonomous robots and perform the selection processing once again. The autonomous robot 11D is thereby able to limit cases in which it is not possible to select an autonomous robot to be a support target by means of the selection processing, and is able to limit an idle state from being entered.

It should be noted that, as in embodiments 2 and 3, the autonomous robot 11D, while executing its tasks, may store the other robot information of other autonomous robots with which communication has been possible. In this case, within the coverage region 21 thereof, the autonomous robot 11D already possesses information of other autonomous robots with which communication is possible, and therefore may move outside of the coverage region 21 thereof in order to acquire the other robot information of new other autonomous robots besides the aforementioned other autonomous robots.

Thus, there is a further increase in the possibility of the autonomous robot 11D being able to communicate with a new other autonomous robot to acquire other robot information. It then becomes possible for the autonomous robot 11D to select a support-target autonomous robot on the basis of the newly acquired other robot information.

Furthermore, the autonomous robot 11D may move in the direction in which it is possible to exit to outside of the coverage region with the shortest movement distance from the coverage region 21. Thus, the autonomous robot 11D is able to exit to outside of the coverage region 21 more quickly, and is therefore able to acquire the other robot information of a new other autonomous robot outside of the coverage region 21 and perform selection processing once again more quickly. It should be noted that examples of a movement direction for when the autonomous robot 11D moves outside of the coverage region 21 are not restricted hereto. These other examples will be described as modified examples.

(Modified Example 1)

The autonomous robot 11D may use location information included in other robot information to move in a direction in which the density of other robots is low.

Figure 25:
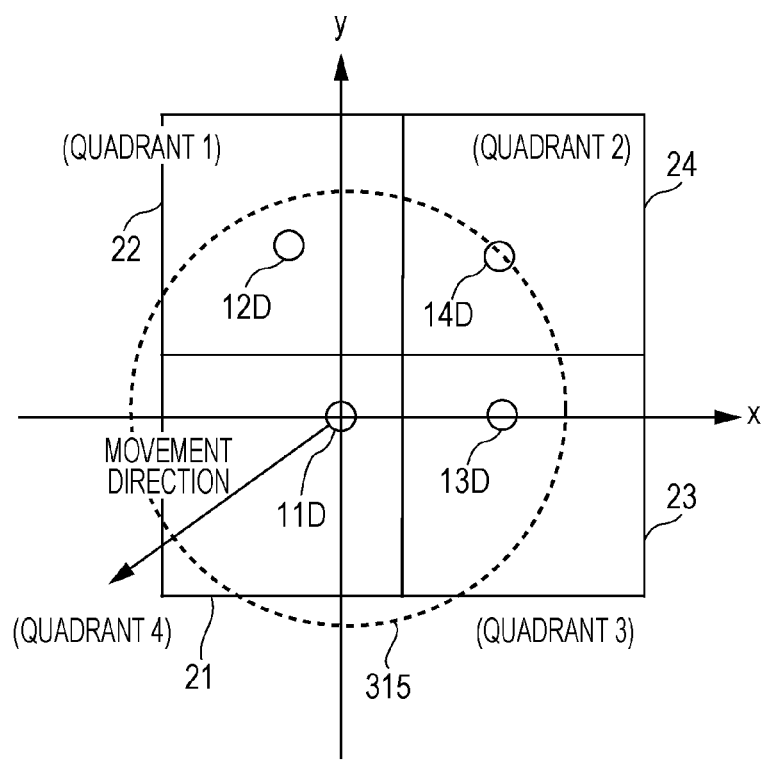
FIG. 25 is a drawing depicting an example of a movement direction for when movement is performed to outside of a coverage region of an autonomous robot in modified example 1 of embodiment 4.

When selecting a support target, it is determined that the autonomous robots 12D to 14D depicted in FIG. 24A do not require support, and therefore it is thought that there is a low possibility of encountering a new other autonomous robot when having moved in a direction in which the autonomous robots 12D to 14D are present. Therefore, movement is made in a direction in which there is a coverage region that is outside of the coverage region 21 and has been determined as having no other autonomous robots present therein. FIG. 25 will be used to describe this example.

FIG. 25 is a drawing depicting an example of a movement direction for when movement is performed to outside of a coverage region of an autonomous robot in modified example 1 of embodiment 4.

It is assumed that the autonomous robot 11D is additionally provided with a direction sensor, for example, and four quadrants are set as depicted in FIG. 25. The autonomous robot 11D then determines in which quadrant the other autonomous robots (autonomous robots 12D to 14D) are present, and moves toward the quadrant having the lowest number of other autonomous robots.

It is thereby possible for the autonomous robot 11D to acquire the other robot information of a new other autonomous robot outside of the coverage region 21 and perform selection processing once again more quickly.

It should be noted that the movement direction is not restricted to the case given in the present modified example. This may be combined with an aforementioned case. In other words, the movement direction may be the direction constituting the shortest movement distance with which it is possible to exit to outside of the coverage region with the shortest movement distance from the coverage region 21, from within the direction of the quadrant having the lowest number of other autonomous robots.

(Modified Example 2)

In the case where the autonomous robot 11D acquires information indicating respective coverage regions from other autonomous robots, the autonomous robot 11D may move toward a region other than the coverage regions of the other autonomous robots. The reason being that it is thought that there is a low possibility of encountering a new other autonomous robot when having moved toward the coverage region of another autonomous robot deemed to not require support during selection processing.

Therefore, it is desirable for movement to be made toward a region other than the coverage regions of the other autonomous robots, outside of the coverage region 21 of the autonomous robot 11D.

It is thereby possible for the autonomous robot 11D to acquire the other robot information of a new other autonomous robot outside of the coverage region 21 and perform selection processing once again more quickly.

It should be noted that the movement direction is not restricted to the case given in the present modified example. This may be combined with an aforementioned case. In other words, the movement direction may be the direction constituting the shortest movement distance with which it is possible to exit to outside of the coverage region with the shortest movement distance from the coverage region 21, from among regions other than the coverage regions of the other autonomous robots.

(Modified Example 3)

In the case where the autonomous robot 11D has not been able to select a support target by performing the selection processing once again after having moved to outside of the coverage region 21 thereof, the autonomous robot 11D may, in addition, move in a direction having a low density of other autonomous robots that have not been selected due to not requiring support.

It is thereby possible for the autonomous robot 11D to acquire the other robot information of a new other autonomous robot outside of the coverage region 21 and perform selection processing once again more quickly.

It should be noted that the autonomous robot 11D, after having exited to outside of the coverage region 21 thereof, may move without passing through the coverage regions of other autonomous robots that have not been selected as support targets (by moving through regions other than said coverage regions).

Furthermore, the way in which the autonomous robot 11D moves after having exited to outside of the coverage region 21 thereof is not restricted to the aforementioned case, and the autonomous robot 11D may move with the route being decided or may move in a random manner. In other words, any manner of movement is permissible.

(Modified Example 4)

It should be noted that, in the case where the autonomous robots 11D to 19D are cleaning robots, it is necessary for them to return to their own coverage regions after the cleaning, namely the tasks, has been completed. This is because garbage and dust accumulate as time elapses, and it becomes necessary to perform cleaning once again.

In this case, for example, the autonomous robot 11D may be provided with a movement restriction so as to not move too far away from the coverage region 21 thereof when moving outside of the coverage region to search for another autonomous robot to be a support target. As restrictions, the following are feasible: 1) the movement distance or movement time from exiting to outside of the coverage region and starting to move; 2) the distance from the coverage region boundary (any point is permissible); 3) a prescribed threshold value for the battery state; and 4) the number of other autonomous robots that are newly detected, or the like.

It thereby becomes possible for the autonomous robot 11D to not move too far away from the coverage region 21 thereof even when searching for another autonomous robot to serve as a support target.

As described above, a movement control method and a movement control device according to one or more aspects of the present disclosure have been described on the basis of the embodiments; however, the present disclosure is not restricted to these embodiments. Modes in which various modifications conceived by a person skilled in the art have been implemented in the present embodiments, and modes constructed by combining the constituent elements in different embodiments may also be included within the scope of one or more aspects of the present disclosure provided they do not depart from the purpose of the present disclosure.

For example, the restriction described in modified example 4 of embodiment 4 may be applied to embodiments 1 to 3.

Furthermore, in the aforementioned embodiments, operations and the like have been described with the autonomous robots 11 to 11D given as examples; however, the present disclosure is not restricted thereto. It is possible for other autonomous robots to also be provided with the same minimum configuration and to perform the same operations.

It should be noted that, in the aforementioned embodiments, the constituent elements may be configured by using dedicated hardware, or may be realized by executing a software program suitable for the constituent elements. The constituent elements may be realized by a program execution unit such as a CPU or a processor reading out and executing a software program recorded in a recording medium such as a hard disk or a semiconductor memory.

For example, some or all of the functions of an autonomous robot according to embodiments 1 to 4 may typically be realized as an LSI, which is an integrated circuit. These may be implemented separately as single chips, or may be implemented as a single chip in such a way as to include some or all of the functions. Furthermore, the circuit integration is not restricted to an LSI, and the functions may be realized using a dedicated circuit or a general-purpose processor. After an LSI is manufactured, a field-programmable gate array (FPGA) that can be programmed, or a reconfigurable processor with which the connections and settings of circuits cells within the LSI can be reconfigured, may be used.

Furthermore, some or all of the functions of an autonomous robot according to embodiments 1 to 4 may be realized by a processor such as a CPU executing a program.

Furthermore, the numerals used hereinabove are all examples for explaining the present disclosure in detail, and the present disclosure is not restricted to the numerals given as examples.

Furthermore, the sequences in which steps are executed, depicted in the aforementioned FIGS. 6, 7, 9, 15, and 21, are all examples for explaining the present disclosure in detail, and may be sequences other than the aforementioned provided the same effect is obtained. Furthermore, some of the steps may be executed at the same time as (in parallel with) other steps.

The present disclosure can be used in a movement control method and a movement control device for autonomous mobile robots, and in particular can be used in a movement control method and a movement control device in autonomous robots that have a wireless communication function and are able to perform tasks with respect to regions assigned thereto while moving in an autonomous manner and in a robot system that includes the autonomous robots.

What is claimed is:

1. A movement control method in a robot system including a plurality of autonomous mobile robots that execute tasks with respect to coverage regions assigned respectively thereto, a first robot of the plurality of autonomous mobile robots comprising:
   a communication interface that communicates with the plurality of robots;
   a motor that drives the first robot;
   a position sensor that detects a location of the first robot;
   a memory that stores robot information regarding at least one of the plurality of robots; and
   a processor,
   the movement control method performed by the processor of the first robot, comprising:
   receiving, via the communication interface, from each robot in a robot group, robot information of each robot in the robot group, the robot group including at least one robot of the plurality of robots that is within a communication range of the first robot, the robot information of each robot in the robot group including a robot identifier that identifies the robot, a location of the robot, an expected task end time of the robot, and a task-incomplete region of the robot;
   storing, in the memory, the received robot information of each robot in the robot group;
   selecting, when a task is completed with respect to a first coverage region assigned to the first robot of the plurality of robots, a second robot as a support-target robot, from the robot group, based on the location of the first robot detected by the position sensor and the robot information stored in the memory;
   driving the motor to move the first robot toward a second coverage region assigned to the selected second robot;
   determining, whether a third robot of the plurality of robots comes within the communication range of the first robot while the first robot is moving toward the second coverage region;
   when it is determined that a third robot of the plurality of robots comes within the communication range of the first robot while the first robot is moving toward the second coverage region, receiving, via the communication interface, from the third robot, information of the third robot including a robot identifier that identifies the third robot, a location of the third robot, an expected task end time of the third robot, and a task-incomplete region of the third robot;
   determining whether or not to switch the support-target robot from the second robot to the third robot based on the location of the first robot detected by the position sensor and the robot information stored in the memory and the received information of the third robot; and
   when it is determined to switch the support-target robot from the second robot to the third robot, driving the motor to move the first robot toward a third coverage region assigned to the third robot as the support-target robot.

2. The method according to claim 1, wherein,
   in the determining of whether or not to switch the support-target robot, the processor of the first robot determines to switch the support-target robot from the second robot to the third robot, when the expected task end time, at which the third robot will complete a task with respect to the third coverage region, is later than the expected task end time, at which the second robot will complete a task with respect to the second coverage region, and there will be a remaining task for the third robot at a time point at which the first robot will have moved from the location of the first robot to the location of the third robot.

3. The method according to claim 1, further comprising:
   notifying, when the first robot starts moving toward the second coverage region, the second robot of information indicating that the first robot is moving toward the second robot to provide support for completing the task for the second coverage region; and,
   notifying, when the first robot starts moving toward the third coverage region, (i) the third robot of information indicating that support for completing the task for the third coverage region is to be provided, and (ii) the second robot of information indicating that the first robot is not moving toward the second robot to provide support for the second robot.

4. The method according to claim 1, further comprising:
   determining, when an $M^{th}$ robot (M being a natural number of 3 or more) of the plurality of robots comes within the communication range of the first robot while the first robot is moving toward an $N^{th}$ coverage region (N being a natural number of 3 or more) that includes the third coverage region and does not include the first coverage region, whether or not to switch the support-target robot to the $M^{th}$ robot; and
   driving the motor of the first robot to move the first robot toward an $M^{th}$ coverage region assigned to the $M^{th}$ robot, when it is determined to switch the support-target robot to the $M^{th}$ robot.

5. The method according to claim 4, wherein
   the memory of the first robot further stores frequency information indicating a frequency limit that is a number of times that the support-target robot can be switched, and,
   in the determining as to whether or not to switch the support-target robot to the $M^{th}$ robot, the processor of the first robot determines not to switch the support-target robot to the $M^{th}$ robot when a number of times that the support-target robot has been switched exceeds the frequency limit indicated in the frequency information stored in the memory.

6. The method according to claim 1, further comprising:
   acquiring, using the location of the first robot and the robot information of each robot in the robot group stored in the memory, remaining tasks of each robot for a time point at which the first robot will have moved to the location of each robot in the robot group; and, in the selecting, the first robot selects the second robot as the support-target robot from the robot group, based on the acquired remaining tasks.

7. The method according to claim 6, wherein the memory of the first robot stores the robot information of each robot in the robot group received while executing the task with respect to the first coverage region, the robot information of each robot in the robot group further includes time information indicating a time at which the robot information has been received by the first robot, and the method further comprises:

driving the motor to move the first robot within the first coverage region, when at least one item of the robot information of each robot in the robot group stored in the memory, has been received by the first robot outside of a prescribed period that is based on a time point at which the task with respect to the first coverage region has been completed;

receiving once again the robot information from a robot corresponding to the at least one item of the robot information stored in the memory, when the robot corresponding to the at least one item of the robot information comes within the communication range of the first robot while the first robot is moving within the first coverage region; and, in the acquiring of the remaining tasks, the remaining tasks of each robot in the robot group are acquired based on the robot information that has been received once again.

8. The method according to claim 7, wherein the memory has additionally stored reception location information indicating a location of the first robot when the first robot received the robot information of each robot in the robot group received while executing the task with respect to the first coverage region, and the first robot moves within the first coverage region toward the location indicated by the reception location information corresponding to the at least one item of the robot information.

9. The method according to claim 6, wherein the memory of the first robot stores the robot information of each robot in the robot group received while executing the task with respect to the first coverage region, the robot information of each robot in the robot group further includes time information indicating a time at which the robot information has been received by the first robot, in the selecting, the support-target robot is selected from a robot group, which includes at least two robots other than the first robot, wherein communication is currently possible and has been possible in the past between the at least two robots and the first robot, and, in the acquiring of the remaining tasks, the robot information and time information, stored in the memory, of at least one robot of the plurality of robots, and the location of the first robot are used to estimate the remaining tasks of the at least one robot for a time point at which the first robot will have moved to the at least one robot, to acquire the remaining tasks of each robot in the robot group including the at least one robot, wherein communication has been possible in the past between the first robot and the at least one robot.

10. The method according to claim 6, wherein, in the acquiring of the remaining tasks, the first robot uses the location of the first robot and the location of each robot in the robot group stored in the memory, to calculate a movement time to the location of each robot in the robot group, and uses the calculated movement time and the expected task end time and task-incomplete region of each robot in the robot group to estimate an amount of remaining tasks of each robot, to acquire the remaining tasks of each robot.

11. The method according to claim 10, wherein, in the selecting, the first robot selects the second robot having the largest amount of remaining tasks, from the robot group, as the support-target robot.

12. The method according to claim 1, further comprising:

driving the motor to move the first robot to outside of the first coverage region, when the first robot has completed the task with respect to the first coverage region and is not able to select the support-target robot from the robot group while the first robot is present within the first coverage region;

receiving specific robot information from a specific robot not included in the robot group, when it has become possible for the first robot to communicate with the specific robot not included in the robot group, while the first robot is moving to outside of the first coverage region, the specific robot information including a current location of the specific robot and task information indicating a task progress status of the specific robot;

acquiring, using a current location of the first robot and the received specific robot information of the specific robot not included in the robot group, the remaining tasks for a time point at which the first robot will have moved to the current location of the specific robot not included in the robot group; and selecting the specific robot not included in the robot group as the support-target robot, based on the acquired remaining tasks.

13. An autonomous mobile robot in a robot system including a plurality of autonomous mobile robots that execute tasks with respect to coverage regions assigned respectively thereto, the autonomous mobile robot comprising:

a communication interface that communicates with the plurality of robots;

a motor that drives the autonomous mobile robot;

a position sensor that detects a location of the autonomous mobile robot;

a memory that stores robot information regarding at least one of the plurality of robots; and control circuitry that performs operations comprising:

receiving, via the communication interface, from each robot in a robot group, robot information of each robot in the robot group, the robot group including at least one robot of the plurality of robots that is within a communication range of the autonomous mobile robot, the robot information of each robot in the robot group including a robot identifier that identifies the robot, a location of the robot, an expected task end time of the robot, and a task-incomplete region of the robot;

storing, in the memory, the received robot information of each robot in the robot group;

when a task is completed with respect to a first coverage region assigned to the autonomous mobile robot, selecting a support-target robot from the robot group based on the location of the autonomous mobile robot detected by the position sensor and the robot information stored in the memory, driving the motor to move the autonomous mobile robot toward a second coverage region assigned to the selected support-target robot, determining, whether an other robot of the plurality of robots comes within the communication range of the autonomous mobile robot while the autonomous mobile robot is moving toward the second coverage region;

when it is determined that an other robot of the plurality of robots comes within the communication range of the autonomous mobile robot while the autonomous mobile robot is moving toward the second coverage region, receiving, via the communication interface, from the other robot, robot information of the other robot including a robot identifier that identifies the other robot, a location of the other robot, an expected task end time of the other robot, and a task-incomplete region of the other robot;

determining whether to switch the support-target robot to the other robot based on the location of the autonomous mobile robot detected by the position sensor and the robot information stored in the memory and the received information of the other robot, and, when it is determined to switch the support-target robot to the other robot, driving the motor to move the autonomous mobile robot toward a third coverage region assigned to the other robot as the support-target robot.

\* \* \* \* \*